(12) United States Patent
Lee et al.

(10) Patent No.: US 12,081,527 B2
(45) Date of Patent: Sep. 3, 2024

(54) SECURITY FOR SCENE-BASED SENSOR NETWORKS, WITH ACCESS CONTROL

(71) Applicant: Scenera, Inc., Palo Alto, CA (US)

(72) Inventors: David D. Lee, Palo Alto, CA (US); Andrew Augustine Wajs, Haarlem (NL); Seungoh Ryu, Newton, MA (US); Chien Lim, San Jose, CA (US)

(73) Assignee: Scenera, Inc., Palo Alto, CA (US)

( * ) Notice: Subject to any disclaimer, the term of this patent is extended or adjusted under 35 U.S.C. 154(b) by 0 days.

(21) Appl. No.: 17/580,531

(22) Filed: Jan. 20, 2022

(65) Prior Publication Data

US 2022/0329571 A1 Oct. 13, 2022

Related U.S. Application Data

(63) Continuation of application No. 16/878,311, filed on May 19, 2020, now Pat. No. 11,245,676, which is a
(Continued)

(51) Int. Cl.
*H04L 9/40* (2022.01)
*G06F 21/10* (2013.01)
(Continued)

(52) U.S. Cl.
CPC .......... *H04L 63/0428* (2013.01); *G06F 21/57* (2013.01); *G06F 21/6245* (2013.01);
(Continued)

(58) Field of Classification Search
CPC ..... H04L 63/0428; H04L 9/3236; H04L 9/50; G06F 21/10; G06F 21/57; G06F 21/6245;
(Continued)

(56) References Cited

U.S. PATENT DOCUMENTS 6,031,573 A  2/2000 MacCormack et al.
6,628,339 B1  9/2003 Ferland et al.
(Continued)

FOREIGN PATENT DOCUMENTS

WO  WO-2008027626 A3 *  5/2008  ............ G06F 16/29
WO  WO 2016/044778 A1  3/2016

OTHER PUBLICATIONS

PCT International Search Report and Written Opinion, PCT Application No. PCT/US17/32267, dated Jul. 31, 2017, 28 pages.
(Continued)

*Primary Examiner* — Richard A Hansell, Jr.
(74) *Attorney, Agent, or Firm* — Fenwick & West LLP

(57) ABSTRACT

Security and access control is provided for sensor devices, the data captured by sensor devices, and the results of processing and analyzing that data. In one aspect, SceneData related to a Scene is requested from a sensor-side technology stack and at least some of the SceneData is secured, for example by encryption. Different SceneData can be secured separately and at different levels of security, thus providing fine-grained security of the SceneData. In yet another aspect, data security is implemented by a separate privacy management system. In yet another aspect, sensor devices themselves are secured against external network threats. The sensor device includes an execution environment and a separate network management layer that secures the execution environment against threats from the external network. In one implementation, the sensor device is partitioned into a trusted region and a non-trusted region, and the network security stack is implemented in the trusted region.

20 Claims, 18 Drawing Sheets

Application: Home Surveillance

Scene Mode: #1

Camera Capabilities:

Exposure · Gain · RGB · IR · Audio
Iris/Aperture · Pan/Tilt/Zoom · Flash · Temperature
Depth · Optical Flow · Face Recognition · Object Recognition
Emotion Recognition · Sound Recognition · P2P · SNS SceneData
Audio:

Video Frames:
Frame 1 (RGB)    Frame 2 (IR)

Tagged Metadata:
Optical Flow: Motion detected
Object Recognition: 2 Human detected
Face Recognition: Unknown person Triggered Action:
Sound the Alarm and notify home owner

Related U.S. Application Data continuation of application No. 15/642,311, filed on Jul. 5, 2017, now Pat. No. 10,693,843.

(60) Provisional application No. 62/383,288, filed on Sep. 2, 2016.

(51) Int. Cl.

| | |
|---|---|
| *G06F 21/57* | (2013.01) |
| *G06F 21/62* | (2013.01) |
| *G06V 20/40* | (2022.01) |
| *G06V 20/52* | (2022.01) |
| *G11B 27/28* | (2006.01) |
| *G11B 27/34* | (2006.01) |
| *H04L 9/00* | (2022.01) |
| *H04L 9/32* | (2006.01) |
| *H04N 7/18* | (2006.01) |

(52) U.S. Cl.
CPC .............. *G06V 20/41* (2022.01); *G06V 20/52* (2022.01); *G11B 27/28* (2013.01); *G11B 27/34* (2013.01); *H04L 9/3236* (2013.01); *H04N 7/181* (2013.01); *G06F 21/1062* (2023.08); *G06F 2221/2107* (2013.01); *G06F 2221/2113* (2013.01); *H04L 9/50* (2022.05)

(58) Field of Classification Search
CPC ..... G06F 2221/0724; G06F 2221/2107; G06F 2221/2113; G06V 20/41; G06V 20/52; G11B 27/28; G11B 27/34; H04N 7/181
See application file for complete search history.

(56) References Cited

U.S. PATENT DOCUMENTS

| | | | | |
|---|---|---|---|---|
| 8,560,785 | B1* | 10/2013 | Malhotra | G06F 21/6218 |
| | | | | 711/162 |
| 8,970,654 | B1 | 3/2015 | Johnson et al. | |
| 9,225,889 | B1 | 12/2015 | Korkin | |
| 9,992,191 | B2* | 6/2018 | D'Souza | G06F 16/9538 |
| 10,509,459 | B2 | 12/2019 | Lee et al. | |
| 11,748,991 | B1* | 9/2023 | Day | B60Q 3/74 |
| | | | | 348/143 |
| 2001/0043271 | A1 | 11/2001 | Kawano | |
| 2003/0105830 | A1* | 6/2003 | Pham | H04L 63/0428 |
| | | | | 709/239 |
| 2004/0048507 | A1 | 3/2004 | Hage | |
| 2004/0068583 | A1* | 4/2004 | Monroe | H04L 67/5651 |
| | | | | 709/246 |
| 2004/0223054 | A1* | 11/2004 | Rotholtz | G08B 13/19682 |
| | | | | 348/E7.086 |
| 2005/0132385 | A1 | 6/2005 | Bourges Sevenier | |
| 2006/0055819 | A1 | 3/2006 | Pokrovsky et al. | |
| 2006/0187338 | A1 | 8/2006 | May et al. | |
| 2007/0195182 | A1 | 8/2007 | Ito | |
| 2008/0024614 | A1 | 1/2008 | Li et al. | |
| 2008/0074540 | A1 | 3/2008 | Liu | |
| 2008/0211941 | A1 | 9/2008 | Deever et al. | |
| 2010/0079625 | A1 | 4/2010 | Miwa | |
| 2010/0250497 | A1 | 9/2010 | Redlich et al. | |
| 2010/0321528 | A1 | 12/2010 | Yu et al. | |
| 2011/0199497 | A1 | 8/2011 | Motta | |
| 2011/0211215 | A1* | 9/2011 | Yamamoto | G06K 15/4095 |
| | | | | 358/1.14 |
| 2011/0234807 | A1 | 9/2011 | Jones et al. | |
| 2011/0242317 | A1 | 10/2011 | Wengrovitz | |
| 2012/0151432 | A1 | 6/2012 | Long et al. | |
| 2012/0162366 | A1 | 6/2012 | Ninan et al. | |
| 2012/0258658 | A1 | 10/2012 | Matsuo | |
| 2012/0275640 | A1* | 11/2012 | Widzinski | G06V 20/80 |
| | | | | 382/100 |
| 2012/0294583 | A1* | 11/2012 | Kosaka | G06T 13/80 |
| | | | | 386/E5.028 |
| 2013/0057713 | A1 | 3/2013 | Khawand | |
| 2013/0176458 | A1 | 7/2013 | Van Dalen et al. | |
| 2013/0272627 | A1 | 10/2013 | Chen et al. | |
| 2013/0308036 | A1 | 11/2013 | Peng | |
| 2014/0022399 | A1 | 1/2014 | Rashid | |
| 2014/0139643 | A1 | 5/2014 | Högasten et al. | |
| 2014/0164776 | A1* | 6/2014 | Hook | G06F 21/6218 |
| | | | | 713/171 |
| 2014/0306010 | A1* | 10/2014 | Prokop | A61J 3/007 |
| | | | | 235/440 |
| 2015/0146037 | A1 | 5/2015 | Keelan | |
| 2015/0227797 | A1 | 8/2015 | Ko et al. | |
| 2015/0244943 | A1 | 8/2015 | Brown | |
| 2015/0256623 | A1* | 9/2015 | Ryhorchuk | H04L 67/12 |
| | | | | 709/217 |
| 2015/0334285 | A1 | 11/2015 | Zhang et al. | |
| 2015/0350711 | A1 | 12/2015 | Guzik | |
| 2015/0363018 | A1* | 12/2015 | Miyake | H04N 21/43637 |
| | | | | 345/173 |
| 2016/0006920 | A1 | 1/2016 | Gomes Da Motta et al. | |
| 2016/0044227 | A1 | 2/2016 | Johnson et al. | |
| 2016/0056964 | A1* | 2/2016 | Andiappan | H04L 9/3263 |
| | | | | 713/189 |
| 2016/0063036 | A1* | 3/2016 | Kawai | G06F 3/04883 |
| | | | | 345/173 |
| 2016/0112630 | A1 | 4/2016 | Kanumuri et al. | |
| 2016/0127333 | A1* | 5/2016 | Sood | H04L 9/0877 |
| | | | | 380/44 |
| 2016/0134932 | A1* | 5/2016 | Karp | H04L 67/125 |
| | | | | 348/207.11 |
| 2017/0093852 | A1* | 3/2017 | Khosravi | H04L 63/0876 |
| 2017/0180386 | A1* | 6/2017 | Dewan | G09C 1/00 |
| 2017/0336858 | A1 | 11/2017 | Lee et al. | |
| 2017/0337425 | A1 | 11/2017 | Lee et al. | |
| 2017/0339328 | A1 | 11/2017 | Hamada | |
| 2018/0234496 | A1* | 8/2018 | Ratias | H04L 67/535 |
| 2018/0349709 | A1* | 12/2018 | Shinohara | G06V 20/52 |

OTHER PUBLICATIONS

PCT Invitation to Pay Additional Fees, PCT Application No. PCT/US17/32269, dated Jul. 18, 2017, 2 pages.
PCT Invitation to Pay Additional Fees, PCT Application No. PCT/US17/32268, dated Jul. 18, 2017, 2 pages.
PCT International Search Report and Written Opinion, PCT Application No. PCT/US17/32269, dated Sep. 14, 2017, 24 pages.
PCT International Search Report and Written Opinion, PCT Application No. PCT/US17/32268, dated Sep. 15, 2017, 22 pages.
PCT Invitation to Pay Additional Fees, PCT Application No. PCT/US17/48383, dated Oct. 18, 2017, 2 pages.
PCT International Search Report and Written Opinion, PCT Application No. PCT/US17/48383, dated Dec. 22, 2017, 18 pages.
United States Office Action, U.S. Appl. No. 16/526,809, dated Aug. 16, 2019, 9 pages.
Wikipedia, "Application Programming Interface," Date Unknown, [Online] Retrieved from the Internet <URL: https://en.wikipedia.org/wiki/Application_programming_interface>.
Wikipedia, "Encryption," Date Unknown, [Online] Retrieved from the Internet <URL: https://en.wikipedia.org/wiki/Encryption>.
United States Office Action, U.S. Appl. No. 15/642,311, filed Oct. 30, 2019, 17 pages.
United States Office Action, U.S. Appl. No. 15/642,311, filed Jun. 22, 2018, 22 pages.
United States First Action Interview Office Action, U.S. Appl. No. 15/642,311, filed Feb. 16, 2018, 9 pages.
United States Pre-interview Office Action, U.S. Appl. No. 15/642,311, filed Oct. 20, 2017, 6 pages.
United States Office Action, U.S. Appl. No. 16/878,311, filed May 25, 2021, 7 pages.
United States Office Action, U.S. Appl. No. 16/878,311, filed Oct. 16, 2020, 18 pages.

* cited by examiner

Application: Home Surveillance

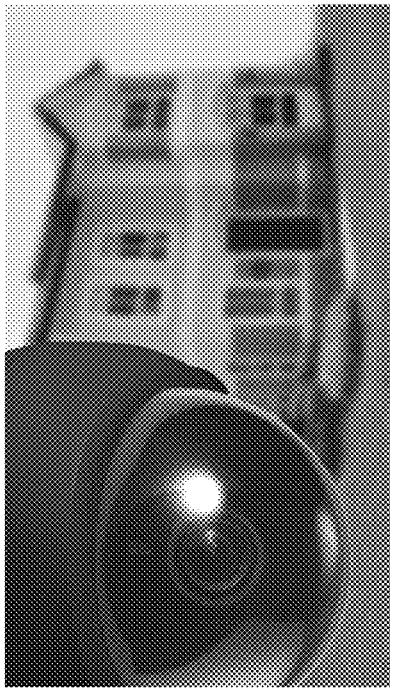

Scene Mode: #1

Camera Capabilities:

[Exposure] · [Gain] · [RGB] · [IR] · [Audio]

Iris/Aperture · Pan/Tilt/Zoom · Flash · Temperature

Depth · [Optical Flow] · [Face Recognition] · [Object Recognition]

Emotion Recognition · Sound Recognition · [P2P] · SNS

SceneData
Audio:

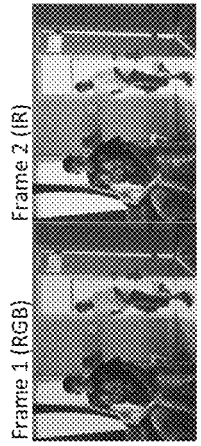

Video Frames:

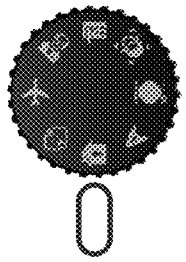

Frame 1 (RGB)   Frame 2 (IR)

Tagged Metadata:
Optical Flow: Motion detected
Object Recognition: 2 Human detected
Face Recognition: Unknown person

Triggered Action:
Sound the Alarm and notify home owner

FIG. 4

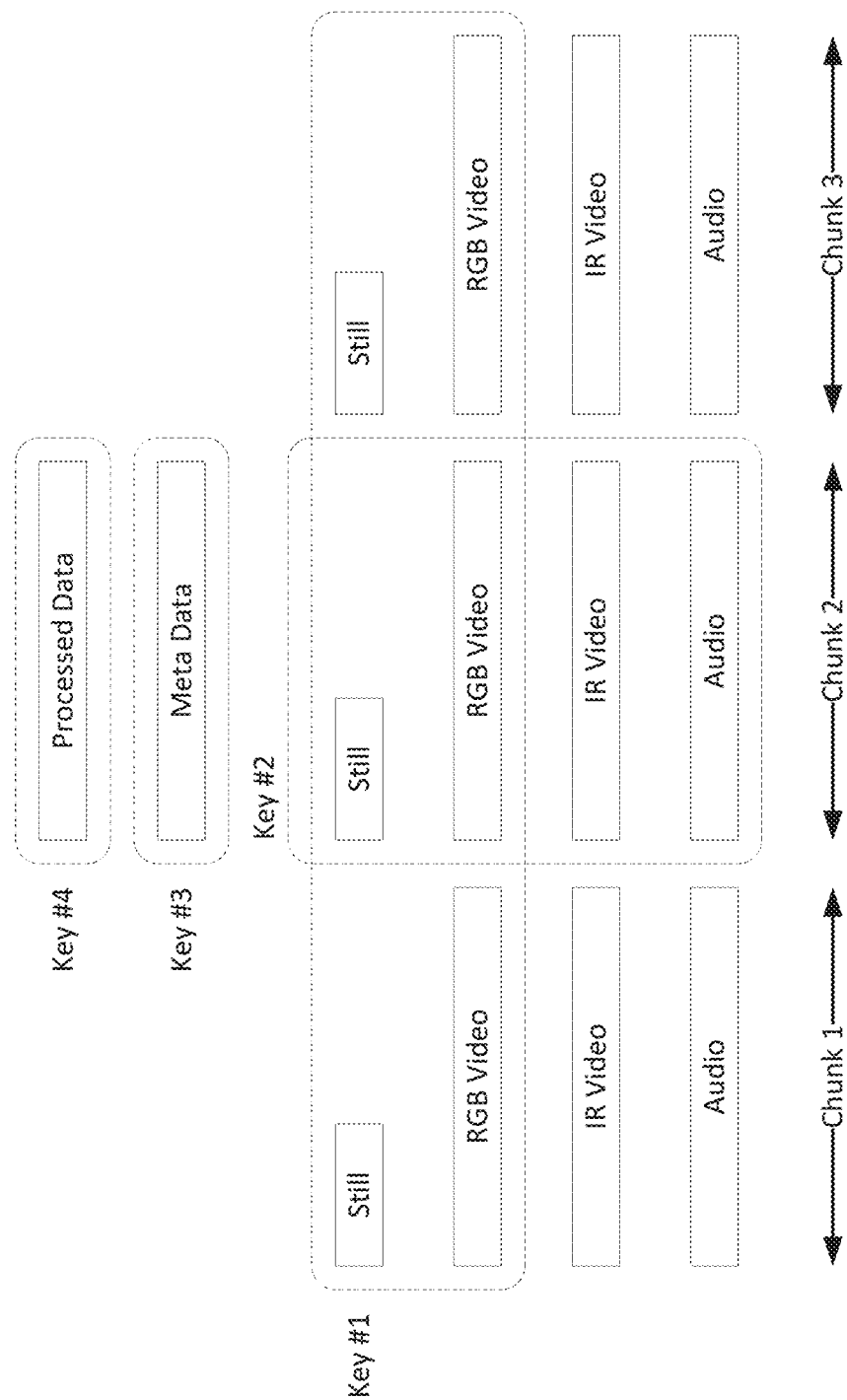

SECURITY FOR SCENE-BASED SENSOR NETWORKS, WITH ACCESS CONTROL

CROSS-REFERENCE TO RELATED APPLICATION(S)

This application is a continuation of U.S. patent application Ser. No. 16/878,311, "Security for Scene-based Sensor Networks, with Privacy Management System" filed May 19, 2020; which is a continuation of U.S. patent application Ser. No. 15/642,311, U.S. Pat. No. 10,693,843, "Security for Scene-based Sensor Networks" filed Jul. 5, 2017; which claims priority under 35 U.S.C. § 119(e) to U.S. Provisional Patent Appl. No. 62/383,288 "Sensor Interface for Use with Network of Intelligent Surveillance Sensors" filed Sep. 2, 2016. The subject matter of all of the foregoing are incorporated herein by reference in its entirety.

BACKGROUND

1. Field of the Invention

This disclosure relates generally to securing sensor devices and information from sensor devices, including for example cameras.

2. Description of Related Art

Millions of cameras and other sensor devices are deployed today. There generally is no mechanism to enable computing to easily interact in a meaningful way with content captured by cameras. This results in most data from cameras not being processed in real time and, at best, captured images are used for forensic purposes after an event has been known to have occurred. As a result, a large amount of data storage is wasted to store video that in the end analysis is not interesting. In addition, human monitoring is usually required to make sense of captured videos. There is limited machine assistance available to interpret or detect relevant data in images.

Another problem today is that the processing of information is highly application specific. The application-specific software typically is a full stack beginning with low-level interfaces to the sensor devices and progressing through different levels of analysis to the final desired results. As a result, the development of applications that make use of networks of sensors is both slow and limited. The current situation also makes it difficult for applications to share or build on the analysis performed by other applications.

In the few cases where applications can share sensor data or access to sensor devices, that sharing is typically implemented with minimal security precautions. Cameras and other sensor devices that are accessible over a network may present security vulnerabilities, not only for that particular device but also for the broader network. In addition, sharing of sensor data and access to sensor devices typically is also done in an application-specific manner, with access rights and other controls custom programmed for each application. This makes sharing more difficult and cumbersome.

Thus, there is a need for more sophisticated security measures for networked sensor devices and the resulting data and also a need for more flexibility and ease in setting those security measures.

SUMMARY

The present disclosure overcomes the limitations of the prior art by providing security and access control for sensor devices, the data captured by sensor devices, and the results of processing and analyzing that data.

In one aspect, SceneData related to a Scene is requested from a sensor-side technology stack and at least some of the SceneData is secured, for example by encryption. Different SceneData can be secured separately and at different levels of security, thus providing fine-grained security of the SceneData. Security can also be applied to other data derived from the SceneData, such as MetaData and SceneMarks. The SceneData to be provided by the sensor-side technology stack is typically based on a plurality of different types of sensor data captured by the sensor group and typically requires processing and/or analysis of the captured sensor data. The SceneData is organized into SceneShots that are samples of the Scene. Security can be applied at different levels of processing and analysis. In yet another aspect, data security is implemented by a separate privacy management system.

In another aspect, sensor devices themselves are secured against external network threats. The sensor device includes an execution environment and a network management layer. The execution environment is used to operate the sensor device to capture sensor data. The network management layer provides an interface between the sensor device and the external network and is separated from the network management layer. The network management layer includes a network security stack that secures the execution environment against threats from the external network. In one implementation, the sensor device is partitioned into a trusted region and a non-trusted region, and the network security stack is implemented in the trusted region.

Other aspects include components, devices, systems, improvements, methods, processes, applications, computer readable mediums, and other technologies related to any of the above.

BRIEF DESCRIPTION OF THE DRAWINGS

Embodiments of the disclosure have other advantages and features which will be more readily apparent from the following detailed description and the appended claims, when taken in conjunction with the examples shown in the accompanying drawings, in which:

FIG. 4 illustrates an example SceneMode.

FIGS. 7A-7C illustrate different examples of fine-grained security.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Figure 1:
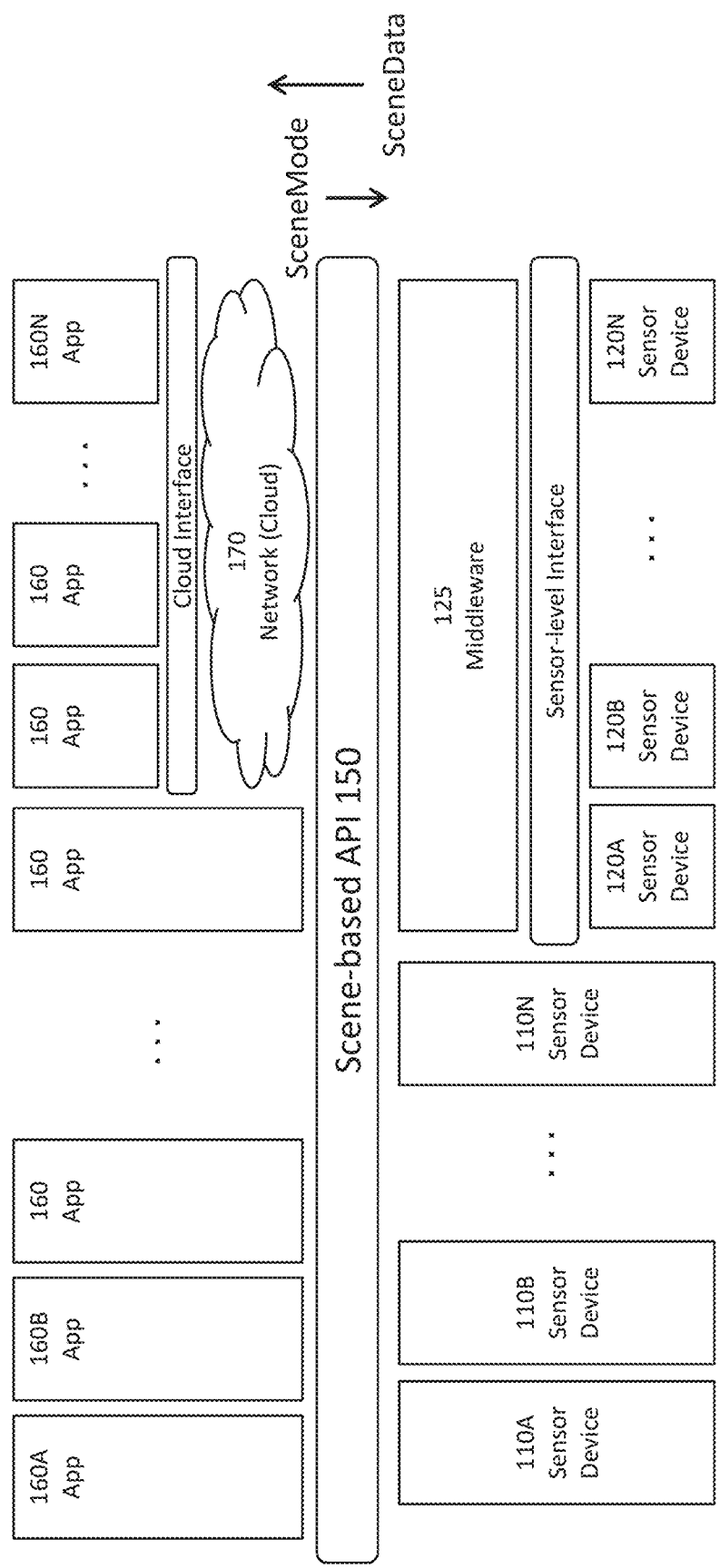
FIG. 1 is a block diagram of a technology stack using Scenes.

FIG. 1 is a block diagram of a technology stack using Scenes. In this example, there are a number of sensor devices 110A-N, 120A-N that are capable of capturing sensor data. Examples of sensor devices include cameras and other image capture devices, including monochrome, single-color, multi-color, RGB, other visible, IR, 4-color (e.g., RGB+IR), stereo, multi-view, strobed, and high-speed; audio sensor devices, including microphones and vibration sensors; depth sensor devices, including LIDAR, depth by deblur, time of flight and structured light devices; and temperature/thermal sensor devices. Other sensor channels could also be used, for example motion sensors and different types of material detectors (e.g., metal detector, smoke detector, carbon monoxide detector). There are a number of applications 160A-N that consume the data captured by the sensor devices 110, 120.

The technology stack from the sensor devices 110, 120 to the applications 160 organizes the captured sensor data into Scenes, and Scenes of interest are marked by SceneMarks, which are described in further detail below. In this example, the generation of Scenes and SceneMarks is facilitated by a Scene-based API 150, although this is not required. Some of the applications 160 access the sensor data and sensor devices directly through the API 150, and other applications 160 make access through networks which will generically be referred to as the cloud 170. As used herein, the "cloud" generally refers to a remote server and/or aggregate (micro-) services, including local counterparts, i.e. a local server or an entity that operates as an extension of the cloud to offer local compute capabilities that may partially or completely replace the need for remote services. The sensor devices 110, 120 and their corresponding data can also make direct access to the API 150, or can make access through the cloud (not shown in FIG. 1).

In FIG. 1, some of the sensor devices 110 are directly compatible with the Scene-based API 150. For other sensor devices 120, for example legacy devices already in the field, compatibility can be achieved via middleware 125. For convenience, the technology stack from the API 150 to the sensor devices 110, 120 will be referred to as the sensor-side stack, and the technology stack from the API 150 to the applications 160 will be referred to as the application-side stack.

The Scene-based API 150 and SceneMarks preferably are implemented as standard. They abstract away from the specifics of the sensor hardware and also abstract away from implementation specifics for processing and analysis of captured sensor data. In this way, application developers can specify their data requirements at a higher level and need not be concerned with specifying the sensor-level settings (such as F/#, shutter speed, etc.) that are typically required today. In addition, device and module suppliers can then meet those requirements in a manner that is optimal for their products. Furthermore, older sensor devices and modules can be replaced with more capable newer products, so long as compatibility with the Scene-based API 150 is maintained.

FIG. 1 shows multiple applications 160 and multiple sensor devices 110, 120. However, any combinations of applications and sensor devices are possible. It could be a single application interacting with one or more sensor devices, one or more applications interacting with a single sensor device, or multiple applications interacting with multiple sensor devices. The applications and sensor devices may be dedicated or they may be shared. In one use scenario, a large number of sensor devices are available for shared use by many applications, which may desire for the sensor devices to acquire different types of data. Thus, data requests from different applications may be multiplexed at the sensor devices. For convenience, the sensor devices 110, 120 that are interacting with an application will be referred to as a sensor group. Note that a sensor group may include just one device.

The system in FIG. 1 is Scene-based, which takes into consideration the context for which sensor data is gathered and processed. Using video cameras as an example, a conventional approach may allow/require the user to specify a handful of sensor-level settings for video capture: f-number, shutter speed, frames per second, resolution, etc. The video camera then captures a sequence of images using those sensor-level settings, and that video sequence is returned to the user. The video camera has no context as to why those settings were selected or for what purpose the video sequence will be used. As a result, the video camera also cannot determine whether the selected settings were appropriate for the intended purpose, or whether the sensor-level settings should be changed as the scene unfolds or as other sensor devices gather relevant data. The conventional video camera API also does not specify what types of additional processing and analysis should be applied to the captured data. All of that intelligence resides on the application-side of a conventional sensor-level API.

In contrast, human understanding of the real world generally occurs at a higher level. For example, consider a security-surveillance application. A "Scene" in that context may naturally initiate by a distinct onset of motion in an otherwise static room, proceed as human activity occurs, and terminate when everyone leaves and the room reverts to the static situation. The relevant sensor data may come from multiple different sensor channels and the desired data may change as the Scene progresses. In addition, the information desired for human understanding typically is higher level than the raw image frames captured by a camera. For example, the human end user may ultimately be interested in data such as "How many people are there?", "Who are they?", "What are they doing?", "Should the authorities be alerted?" In a conventional system, the application developer would have to first determine and then code this intelligence, including providing individual sensor-level settings for each relevant sensor device.

In the Scene-based approach of FIG. 1, some or all of this is moved from the application-side of the API 150 to the sensor-side of the API, for example into the sensor devices/modules 110,120, into the middleware 125, or into other components (e.g., cloud-based services) that are involved in generating SceneData to be returned across the API. As one example, the application developer may simply specify different SceneModes, which define what high level data should be returned to the application. This, in turn, will drive the selections and configurations of the sensor channels optimized for that mode, and the processing and analysis of the sensor data. In the surveillance example, the application specifies a Surveillance SceneMode, and the sensor-side technology stack then takes care of the details re: which types of sensor devices are used when, how many frames per second, resolution, etc. The sensor-side technology stack also takes care of the details re: what types of processing and analysis of the data should be performed, and how and where to perform those.

For certain applications, such as when the automatic processing of video streams may lead to actions being taken (for example raising an alert if an unauthorized person has entered an area, an unauthorized object is detected, etc.), the reliability and integrity of the video stream from the camera to AI processing in the cloud is important. The encryption and authentication of the video and other sensor data becomes an important mechanism to ensure that the video stream has not been tampered with. To enable an entity that is processing the video, to detect that the video has been tampered with, time stamps or counters can be inserted into the stream, typically as part of the video encoding process. The detection of missing time stamps or counters enables the receiving party to detect that the video has been tampered with. The time stamps or counters may be protected from tampering by either being part of the encrypted video payload and or being included in a hash function that is contained in the encrypted payload or is carried separately and is included in a signature mechanism that enables the receiving party to verify that the hash result is obtained from a valid source. By checking that the counters or time stamps are present in the decrypted stream, the receiver can verify that parts of the video sequence have not been removed or replaced.

In a general sense, a SceneMode defines a workflow which specifies the capture settings for one or more sensor devices (for example, using CaptureModes as described below), as well as other necessary sensor behaviors. It also informs the sensor-side and cloud-based computing modules in which Computer Vision (CV) and/or AI algorithms are to be engaged for processing the captured data. It also determines the requisite SceneData and possibly also SceneMarks in their content and behaviors across the system workflow.

In FIG. 1, this intelligence resides in the middleware 125 or in the devices 110 themselves if they are smart devices (i.e., compatible with the Scene-based API 150). Auxiliary processing, provided off-device or on a cloud basis, may also implement some of the intelligence required to generate the requested data.

This approach has many possible advantages. First, the application developers can operate at a higher level that preferably is more similar to human understanding. They do not have to be as concerned about the details for capturing, processing or analyzing the relevant sensor data or interfacing with each individual sensor device or each processing algorithm. Preferably, they would specify just a high-level SceneMode and would not have to specify any of the specific sensor-level settings for individual sensor devices or the specific algorithms used to process or analyze the captured sensor data. In addition, it is easier to change sensor devices and processing algorithms without requiring significant rework of applications. For manufacturers, making smart sensor devices (i.e., compatible with the Scene-based API) will reduce the barriers for application developers to use those devices.

An additional advantage from a security perspective is that the user can determine how much data or images may be made available to a third party. For example SceneData may show people within the view of the camera interacting and the audio may capture what is being said between the parties. The AI systems may extract the identities of the two persons in the camera view. With the concept of SceneData, the user may allow the identities of the two persons to be accessed but may deny access to the actual video and audio content. SceneData and appropriate security can allow other systems to have intermediate access or access due to the result of a specific event. The user may also configure the system to enable access to be granted to SceneData in the event of a specific event or detected feature within the video. For example, in case of a specific face being detected, a notification may be sent to a third party (for example the police) and access may be granted to the video feed. In such case, a field may be added to scene data indicating that it was accessed by a third party, including the conditions or reasons as to why it was accessed. This record of access may be also be stored in some other log file, which may or may not include a signature.

In some cases, rights objects (described in more detail below) are used to define who has access to what. The contents of a rights object may define that in case of access, the access should be logged in a secure log file that is part of the SceneData and also may define that access may be allowed only in case of a predefined condition or event occurring. For example, raw video footage may be accessed only if a firearm is detected. In this example, the video may be processed by an AI system that can detect firearms. A second system operated by the armed response service company may have access to the result of the firearm detection. If a firearm is detected then the rights object that has been provided by a privacy management system will state that the rights agent for the armed response service may decrypt the raw video in case of the firearm being detected. It will also indicate that a record of this access shall be appended to the SceneData.

Returning to FIG. 1, the data returned across the API 150 will be referred to as SceneData, and it can include both the data captured by the sensor devices, as well as additional derived data. It typically will include more than one type of sensor data collected by the sensor group (e.g., different types of images and/or non-image sensor data) and typically will also include some significant processing or analysis of that data.

This data is organized in a manner that facilitates higher level understanding of the underlying Scenes. For example, many different types of data may be grouped together into timestamped packages, which will be referred to as SceneShots. Compare this to the data provided by conventional camera interfaces, which is just a sequence of raw images. With increases in computing technology and increased availability of cloud-based services, the sensor-side technology stack may have access to significant processing capability and may be able to develop fairly sophisticated SceneData. The sensor-side technology stack may also perform more sophisticated dynamic control of the sensor devices, for example selecting different combinations of sensor devices and/or changing their sensor-level settings as dictated by the changing Scene and the context specified by the SceneMode.

As another example, because data is organized into Scenes rather than provided as raw data, Scenes of interest or points of interest within a Scene may be marked and annotated by markers which will be referred to as SceneMarks. In the security surveillance example, the Scene that is triggered by motion in an otherwise static room may be marked by a SceneMark. SceneMarks facilitate subsequent processing because they provide information about which segments of the captured sensor data may be more or less relevant. SceneMarks also distill information from large amounts of sensor data. Thus, SceneMarks themselves can also be cataloged, browsed, searched, processed or analyzed to provide useful insights.

A SceneMark is an object which may have different representations. Within a computational stack, it typically exists as an instance of a defined SceneMark class, for example with its data structure and associated methods. For transport, it may be translated into the popular JSON format, for example. For permanent storage, it may be turned into a file or an entry into a database.

Figure 2A:
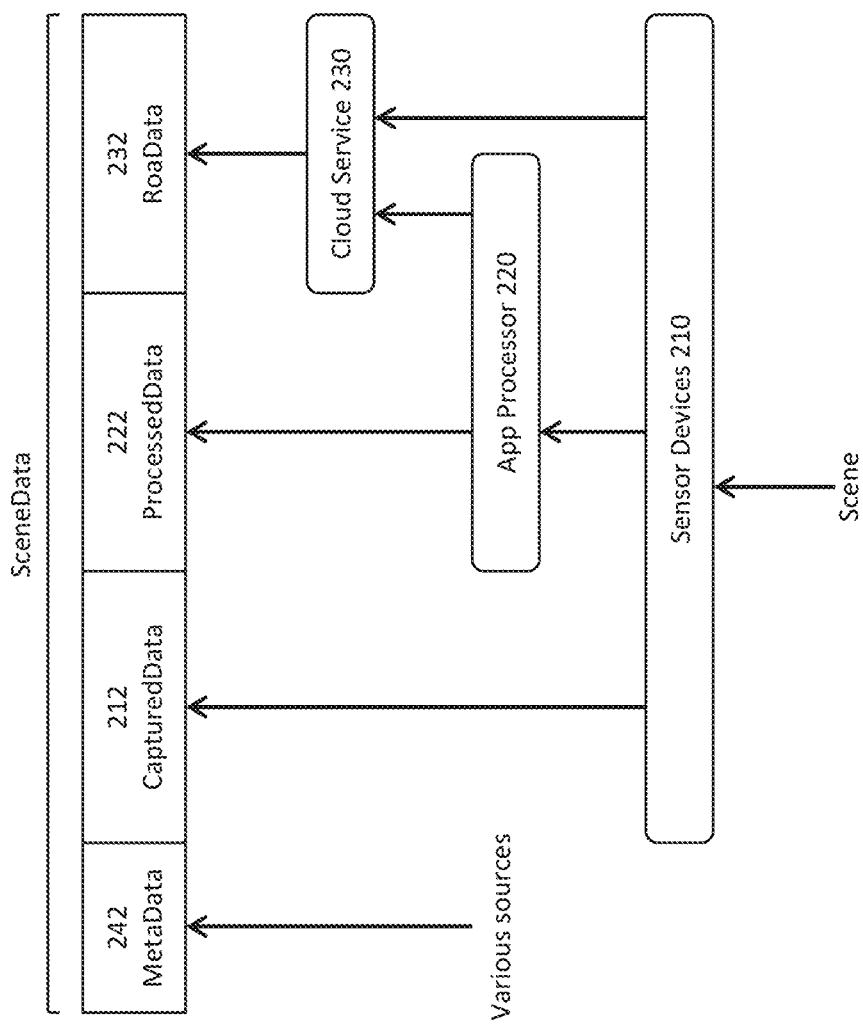
FIG. 2A is a diagram illustrating different types of SceneData.

FIG. 2A is a diagram illustrating different types of SceneData. The base data captured by sensor channels 210 will be referred to as CapturedData 212. Within the video context, examples of CapturedData include monochrome, color, infrared, and images captured at different resolutions and frame rates. Non-image types of CapturedData include audio, temperature, ambient lighting or luminosity and other types of data about the ambient environment. Different types of CapturedData could be captured using different sensor devices, for example a visible and an infrared camera, or a camera and a temperature monitor. Different types of CapturedData could also be captured by a single sensor device with multiple sensors, for example two separate on-board sensor arrays. A single sensor could also be time multiplexed to capture different types of CapturedData—changing the focal length, flash, resolution, etc. for different frames.

CapturedData can also be processed, preferably on-board the sensor device, to produce ProcessedData 222. In FIG. 2A, the processing is performed by an application processor 220 that is embedded in the sensor device. Examples of ProcessedData 222 include filtered and enhanced images, and the combination of different images or with other data from different sensor channels. Noise-reduced images and resampled images are some examples. As additional examples, lower resolution color images might be combined with higher resolution black and white images to produce a higher resolution color image. Or imagery may be registered to depth information to produce an image with depth or even a three-dimensional model. Images may also be processed to extract geometric object representations. Wider field of view images may be processed to identify objects of interest (e.g., face, eyes, weapons) and then cropped to provide local images around those objects. Optical flow may be obtained by processing consecutive frames for motion vectors and frame-to-frame tracking of objects. Multiple audio channels from directed microphones can be processed to provide localized or 3D mapped audio. ProcessedData preferably can be data processed in real time while images are being captured. Such processing may happen pixel by pixel, or line by line, so that processing can begin before the entire image is available.

SceneData can also include different types of MetaData 242 from various sources. Examples include timestamps, geolocation data, ID for the sensor device, IDs and data from other sensor devices in the vicinity, ID for the SceneMode, and settings of the image capture. Additional examples include information used to synchronize or register different sensor data, labels for the results of processing or analyses (e.g., no weapon present in image, or faces detected at locations A, B and C), and pointers to other related data including from outside the sensor group.

Any of this data can be subject to further analysis, producing data that will be referred to generally as ResultsOfAnalysisData, or RoaData 232 for short. In the example of FIG. 2A, the analysis is artificial intelligence/machine learning performed by cloud resources 230. This analysis may also be based on large amounts of other data. Compared to RoaData, ProcessedData typically is more independent of the SceneMode, producing intermediate building blocks that may be used for many different types of later analysis. RoaData tends to be more specific to the end function desired. As a result, the analysis for RoaData can require more computing resources. Thus, it is more likely to occur off-device and not in real-time during data capture. RoaData may be returned asynchronously back to the scene analysis for further use.

SceneData also has a temporal aspect. In conventional video, a new image is captured at regular intervals according to the frame rate of the video. Each image in the video sequence is referred to as a frame. Similarly, a Scene typically has a certain time duration (although some Scenes can go on indefinitely) and different "samples" of the Scene are captured/produced over time. To avoid confusion, these samples of SceneData will be referred to as SceneShots rather than frames, because a SceneShot may include one or more frames of video. The term SceneShot is a combination of Scene and snapshot.

Compared to conventional video, SceneShots can have more variability. SceneShots may or may not be produced at regular time intervals. Even if produced at regular time intervals, the time interval may change as the Scene progresses. For example, if something interesting is detected in a Scene, then the frequency of SceneShots may be increased. A sequence of SceneShots for the same application or same SceneMode also may or may not contain the same types of SceneData or SceneData derived from the same sensor channels in every SceneShot. For example, high resolution zoomed images of certain parts of a Scene may be desirable or additional sensor channels may be added or removed as a Scene progresses. As a final example, SceneShots or components within SceneShots may be shared between different applications and/or different SceneModes, as well as more broadly.

Figure 2B:
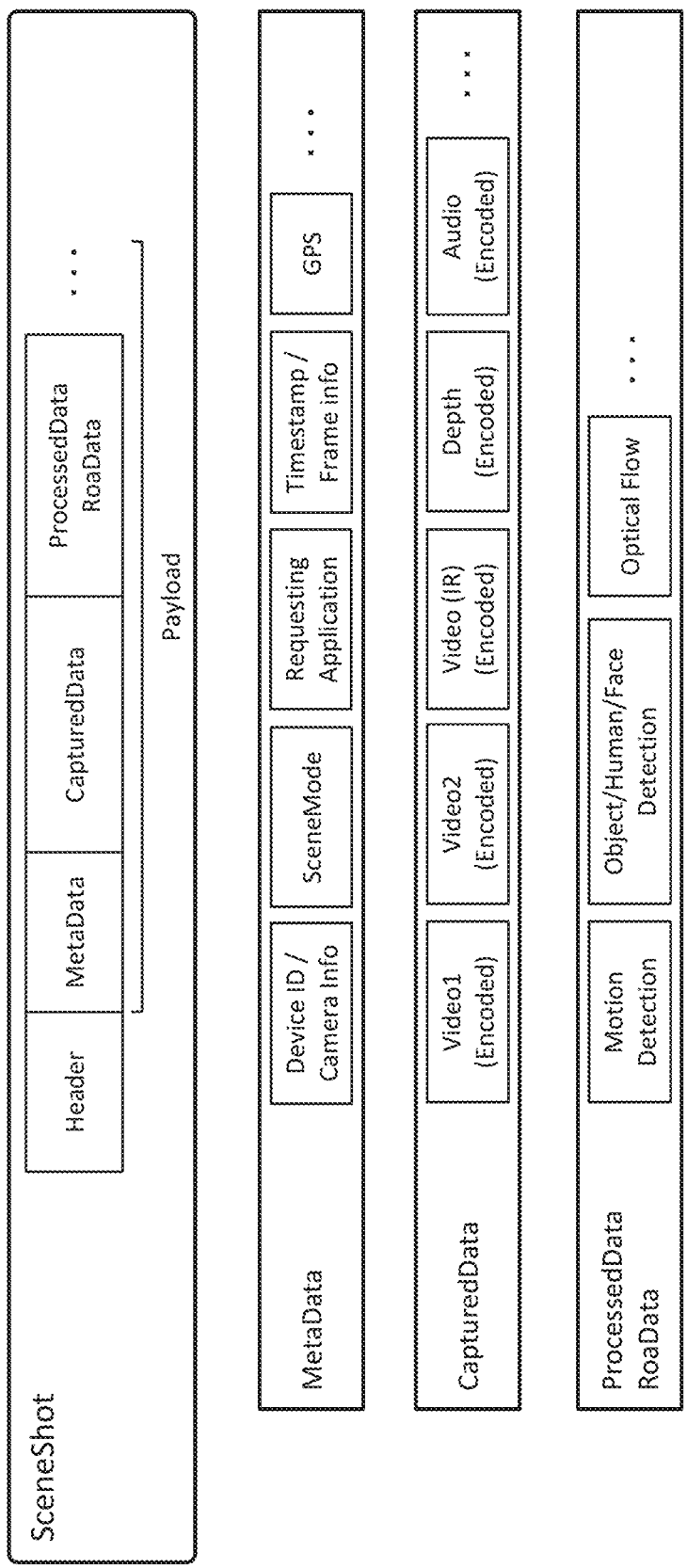
FIG. 2B is a block diagram of a package of SceneData.

FIG. 2B is a block diagram of a SceneShot. This SceneShot includes a header. It includes the following MetaData: sensor device IDs, SceneMode, ID for the requesting application, timestamp, GPS location stamp. The data portion of SceneShot also includes the media data segment such as the CapturedData which may include color video from two cameras, IR video at a different resolution and frame rate, depth measurements, and audio. It also includes the following ProcessedData and/or RoaData: motion detection, object/human/face detections, and optical flow. Unlike conventional video in which each sequential image generally contains the same types of data, the next SceneShot for this Scene may or may not have all of these same components. Note that FIG. 2B is just an example. For example, the actual sensor data may be quite bulky. As a result, this data may be stored by middleware or on the cloud, and the actual data packets of a SceneShot may include pointers to the sensor data rather than the raw data itself. As another example, MetaData may be dynamic (i.e., included and variable with each SceneShot). However, if the MetaData does not change frequently, it may be transmitted separately from the individual SceneShots or as a separate channel.

Figure 2C:
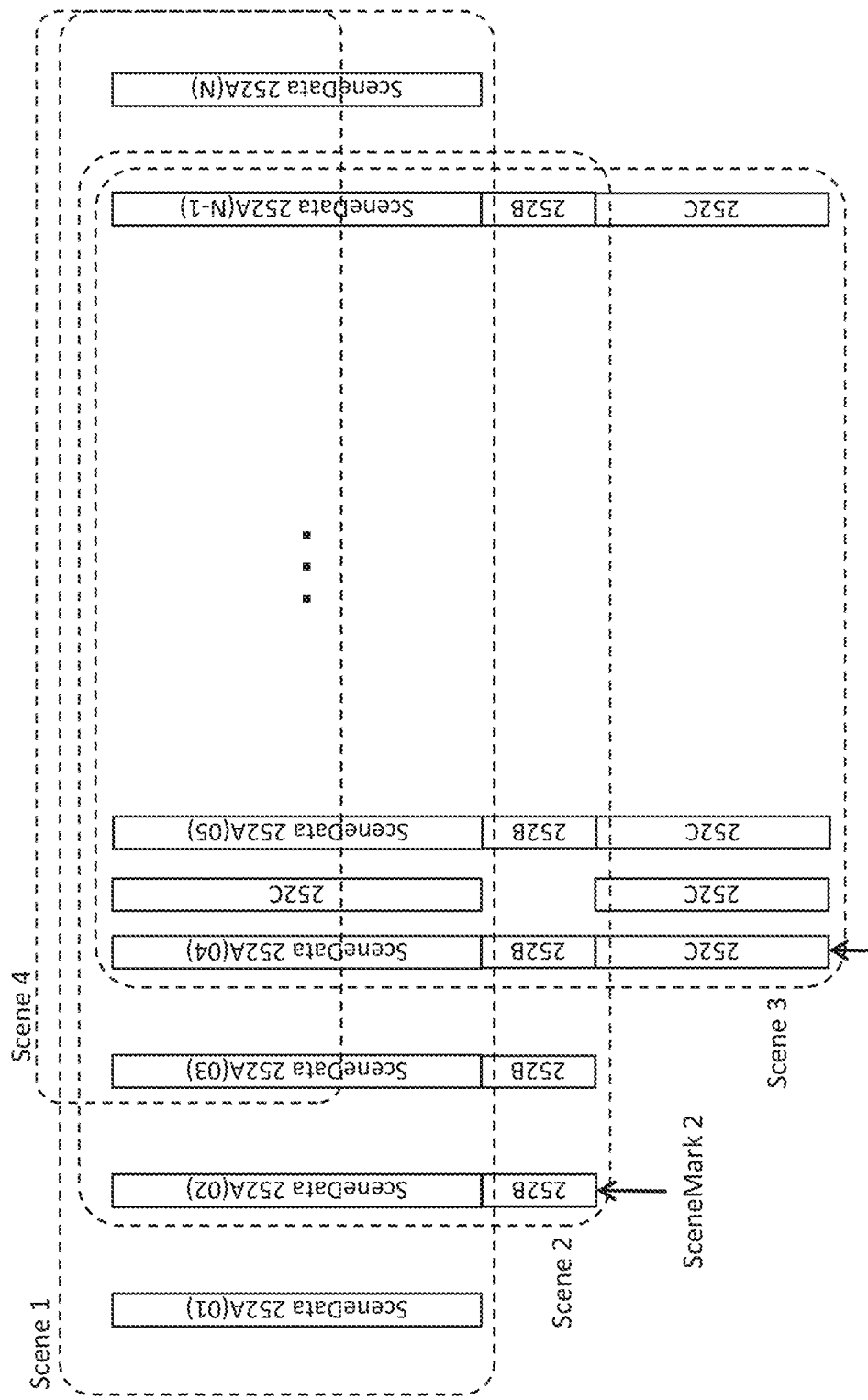
FIG. 2C is a timeline illustrating the use of Scenes and SceneMarks.

FIG. 2C is a timeline illustrating the organization of SceneShots into Scenes. In this figure, time progresses from left to right. The original Scene 1 is for an application that performs after-hours surveillance of a school. SceneData 252A is captured/produced for this Scene 1. SceneData 252A may include coarse resolution, relative low frame rate video of the main entry points to the school. SceneData 252A may also include motion detection or other processed data that may indicative of potentially suspicious activity. In FIG. 2C, the SceneShots are denoted by the numbers in parenthesis (N), so 252A(01) is one SceneShot, 252A(02) is the next SceneShot and so on.

Possibly suspicious activity is detected in SceneShot 252A(01), which is marked by SceneMark 2 and a second Scene 2 is spawned. This Scene 2 is a sub-Scene to Scene 1. Note that the "sub-" refers to the spawning relationship and does not imply that Scene 2 is a subset of Scene 1, in terms of SceneData or in temporal duration. In fact, this Scene 2 requests additional SceneData 252B. Perhaps this additional SceneData is face recognition. Individuals detected on the site are not recognized as authorized, and this spawns Scene 3 (i.e., sub-sub-Scene 3) marked by SceneMark 3. Scene 3 does not use SceneData 252B, but it does use additional SceneData 252C, for example higher resolution images from cameras located throughout the site and not just at the entry points. The rate of image capture is also increased. SceneMark 3 triggers a notification to authorities to investigate the situation.

In the meantime, another unrelated application creates Scene 4. Perhaps this application is used for remote monitoring of school infrastructure for early detection of failures or for preventative maintenance. It also makes use of some of the same SceneData 252A, but by a different application for a different purpose.

Figure 2D:
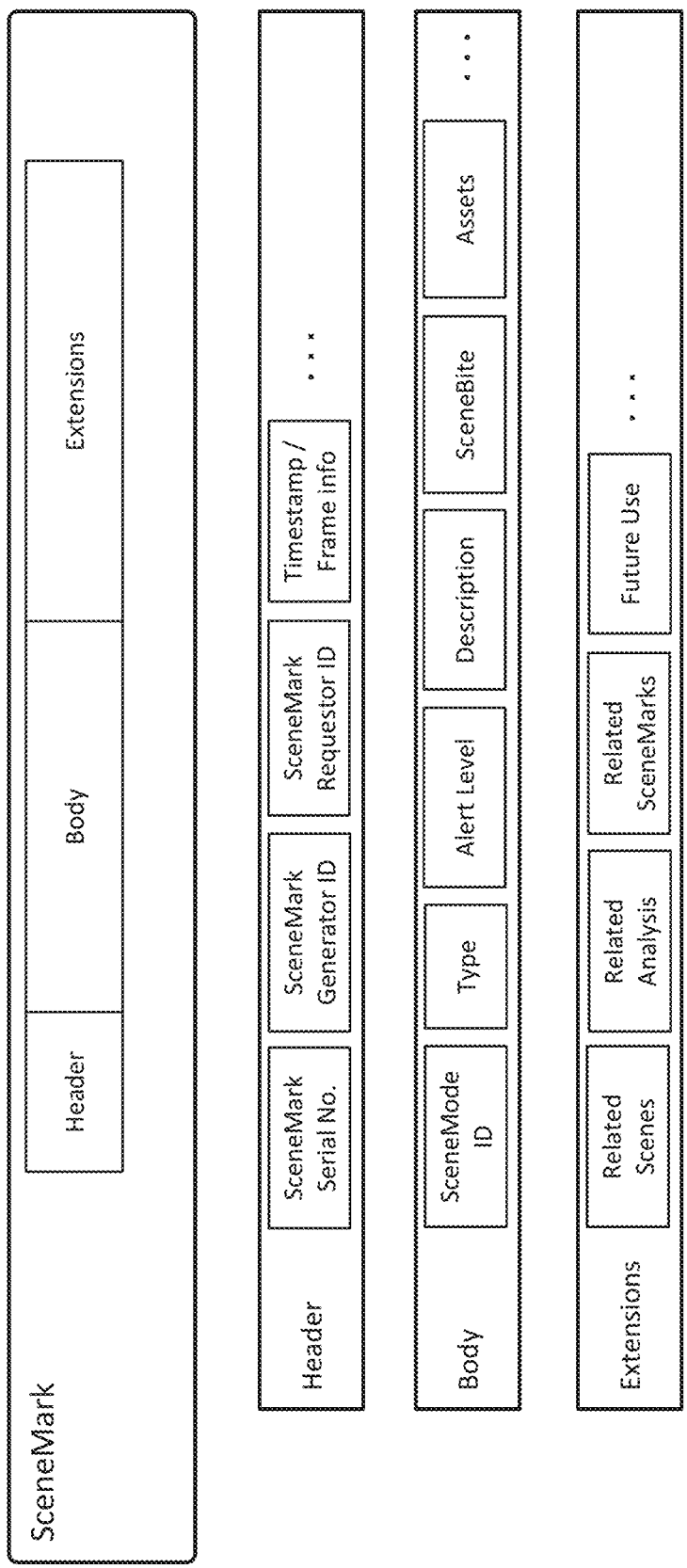
FIG. 2D is a block diagram of a SceneMark.

FIG. 2D is a block diagram of a SceneMark. In this example, the SceneMark includes a header, a main body and an area for extensions. The header identifies the SceneMark. The body contains the bulk of the "message" of the SceneMark. The header and body together establish the provenance for the SceneMark. Supporting data may be included in the body if fairly important and not too lengthy. Alternately, it (or a reference to it) may be included in the extensions.

In this example, the header includes an ID (or a set of IDs) and a timestamp. The Serial No. uniquely identifies the SceneMark. The Generator ID provides information about the source of the SceneMark and its underlying sensor data. The Requestor ID identifies the service or application requesting the related SceneData, thus leading to generation of the SceneMark. In the body, Assets and SceneBite are data such as images and thumbnails. "SceneBite" is analogous to a soundbite for a Scene. It is a lightweight representation of the SceneMark, such as a thumbnail image or short audio clip. Assets are the heavier underlying assets. Extensions permit the extension of the basic SceneMark data structure. In some cases, it may be useful for SceneMarks to be concatenated into manifest files. FIG. 2D is just an example. For additional details and examples of SceneMarks, see U.S. patent application Ser. No. 15/487,416 "Scene Marking," which is incorporated by reference herein.

The concept of having sequential identifiers on SceneMarks can also be applied to ensure that a SceneMark is not deleted by an unauthorized party. For example if someone wishes to remove a SceneMark generated due to an intruder entering the field of view, this will be detectable if each SceneMark that is generated has a sequence number or a pointer to the SceneMark before and/or after it. These identifiers may be protected by having a hash function applied to the SceneMarks and having a chaining mechanism to chain hashes from multiple SceneMarks into a single hash. The integrity of the hash result should be protected by using a known cryptographic signature technique. Another method to protect the integrity of the pointer or sequence number of the SceneMark is to encrypt the SceneMark using a cypherblock chaining technique and to have sufficient structure and or redundancy in the SceneMark to enable the detection of tampering of the encrypted SceneMark. That is, if the encrypted SceneMark is tampered with, the decryption of the tampered SceneMark results in an inconsistency in the data in the SceneMark or in the format of the SceneMark. This inconsistency can be used to detect that the SceneMark has been tampered with.

Figure 3:
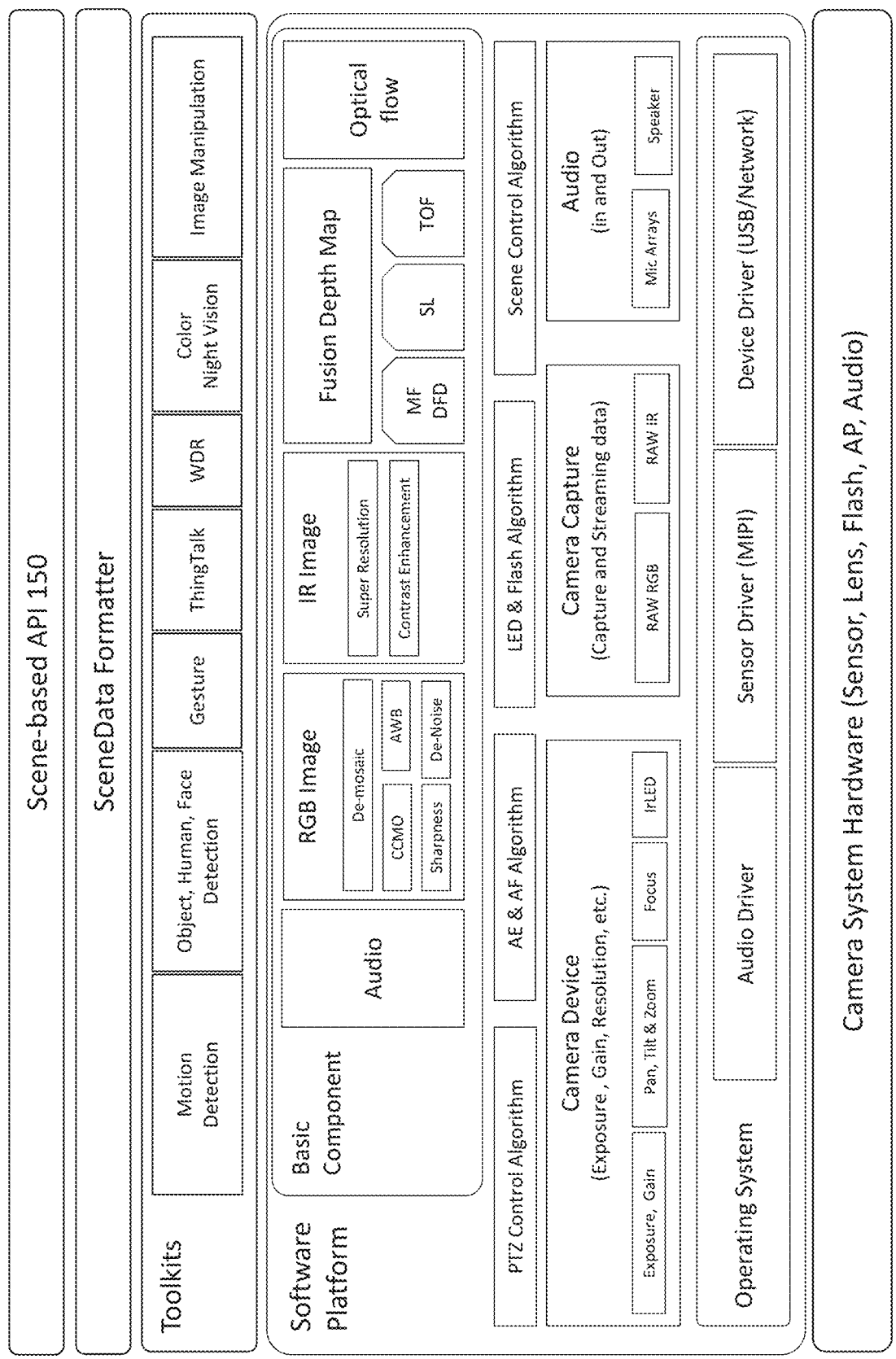
FIG. 3 is a block diagram of middleware that is compliant with a Scene-based API.

Returning to FIG. 1, the applications 160 and sensor channels 110, 120 interface through the Scene-based API 150. The applications 160 specify their SceneModes and the sensor-side technology stack then returns the corresponding SceneData. In many cases, the sensor devices themselves may not have full capability to achieve this. FIG. 3 is a block diagram of middleware 125 that provides functionality to return SceneData requested via a Scene-based API 150. This middleware 125 converts the SceneMode requirements to sensor-level settings that are understandable by the individual sensor devices. It also aggregates, processes and analyzes data in order to produce the SceneData specified by the SceneMode.

The bottom of this this stack is the camera hardware. The next layer up is the software platform for the camera. In FIG. 3, some of the functions are listed by acronym to save space. PTZ refers to pan, tilt & zoom; and AE & AF refer to auto expose and auto focus. The RGB image component includes de-mosaicking, CCMO (color correction matrix optimization), AWB (automatic white balance), sharpness filtering and noise filtering/improvement. The fusion depth map may combine depth information from different depth sensing modalities. In this example, those include MF DFD (Multi Focus Depth by Deblur, which determines depth by comparing blur in images taken with different parameters, e.g., different focus settings), SL (depth determined by projection of Structured Light onto the scene) and TOF (depth determined by Time of Flight). Further up are toolkits and then a formatter to organize the SceneData into SceneShots. In the toolkits, WDR refers to wide dynamic range.

In addition to the middleware, the technology stack may also have access to functionality available via networks, e.g., cloud-based services. Some or all of the middleware functionality may also be provided as cloud-based services. Cloud-based services could include motion detection, image processing and image manipulation, object tracking, face recognition, mood and emotion recognition, depth estimation, gesture recognition, voice and sound recognition, geographic/spatial information systems, and gyro, accelerometer or other location/position/orientation services.

Whether functionality is implemented on-device, in middleware, in the cloud or otherwise depends on a number of factors. Some computations are so resource-heavy that they are best implemented in the cloud. As technology progresses, more of those may increasingly fall within the domain of on-device processing. It remains flexible in consideration of the hardware economy, latency tolerance as well as specific needs of the desired SceneMode or the service.

Generally, the sensor device preferably will remain agnostic of any specific SceneMode, and its on-device computations may focus on serving generic, universally utilizable functions. At the same time, if the nature of the service warrants, it is generally preferable to reduce the amount of data transport required and to also avoid the latency inherent in any cloud-based operation.

The SceneMode provides some context for the Scene at hand, and the SceneData returned preferably is a set of data that is more relevant (and less bulky) than the raw sensor data captured by the sensor channels. In one approach, Scenes are built up from more atomic Events. In one model, individual sensor samples are aggregated into SceneShots, Events are derived from the SceneShots, and then Scenes are built up from the Events. SceneMarks are used to mark Scenes of interest or points of interest within a Scene. Generally speaking, a SceneMark is a compact representation of a recognized Scene of interest based on intelligent interpretation of the time- and/or location-correlated aggregated Events.

The building blocks of Events are derived from monitoring and analyzing sensory input (e.g. output from a video camera, a sound stream from a microphone, or data stream from a temperature sensor). The interpretation of the sensor data as Events is framed according to the context (is it a security camera or a leisure camera, for example). Examples of Events may include the detection of a motion in an otherwise static environment, recognition of a particular sound pattern, or in a more advanced form recognition of a particular object of interest (such as a gun or an animal). Events can also include changes in sensor status, such as camera angle changes, whether intended or not. General classes of Events includes motion detection events, sound detection events, device status change events, ambient events (such as day to night transition, sudden temperature drop, etc.), and object detection events (such as presence of a weapon-like object). The identification and creation of Events could occur within the sensor device itself. It could also be carried out by processor units in the cloud.

Note that Scenes can also be hierarchical. For example, a Motion-in-Room Scene may be started when motion is detected within a room and end when there is no more motion, with the Scene bracketed by these two timestamps. Sub-Scenes may occur within this bracketed timeframe. A sub-Scene of a human argument occurs (e.g. delimited by ArgumentativeSoundOn and Off time markers) in one corner of the room. Another sub-Scene of animal activity (DogChasingCatOn & Off) is captured on the opposite side of the room. This overlaps with another sub-Scene which is a mini crisis of a glass being dropped and broken. Some Scenes may go on indefinitely, such as an alarm sound setting off and persisting indefinitely, indicating the lack of any human intervention within a given time frame. Some Scenes may relate to each other, while others have no relations beyond itself.

Depending on the application, the Scenes of interest will vary and the data capture and processing will also vary. FIG. 4 illustrates an example SceneMode #1, which in this example is used by a home surveillance application. In the lefthand side of FIG. 4, each of the icons on the dial represents a different SceneMode. In FIG. 4, the dial is set to the house icon which indicates SceneMode #1. The SceneData specified by this SceneMode is shown in the righthand side of FIG. 4. The SceneData includes audio, RGB frames, IR frames. It also includes metadata for motion detection (from optical flow capability), human detection (from object recognition capability) and whether the humans are known or strangers (from face recognition capability). To provide the required SceneData, the sensor-side technology stack typically will use the image and processing capabilities which are boxed on the lefthand side of FIG. 4: exposure, gain, RGB, IR, audio, optical flow, face recognition, object recognition and P2P, and sets parameters for these functions according to the mode. Upon detection of unrecognized humans, the application sounds an alarm and notifies the owner. The use of SceneData beyond just standard RGB video frames helps to achieve automatic quick detection of intruders, triggering appropriate actions.

In one approach, SceneModes are based on more basic building blocks called CaptureModes. In general, each SceneMode requires the sensor devices it engages to meet several functional specifications. It may need to set a set of basic device attributes and/or activate available CaptureMode(s) that are appropriate for meeting its objective. In certain cases, the scope of a given SceneMode is narrow enough and strongly tied to the specific CaptureMode, such as Biometric (described in further detail below). In such cases, the line between the SceneMode (on the app/service side) and the CaptureMode (on the device) may be blurred. However, it is to be noted that the CaptureModes are strongly tied to hardware functionalities on the device, agnostic of their intended use(s), and thus remain eligible inclusive of multiple SceneMode engagements. For example, the Biometric CaptureMode may also be used in other SceneModes beyond just the Biometric SceneMode.

Other hierarchical structures are also possible. For example, security might be a top-level SceneMode, security.domestic is a second-level SceneMode, security.domestic.indoors is a third-level SceneMode, and security.domestic.indoors.babyroom is a fourth-level SceneMode. Each lower level inherits the attributes of its higher level SceneModes. Additional examples and details of Scenes, Events, SceneData and SceneModes are described in U.S. patent application Ser. No. 15/469,380 "Scene-based Sensor Networks", which is incorporated by reference herein.

Figure 5:
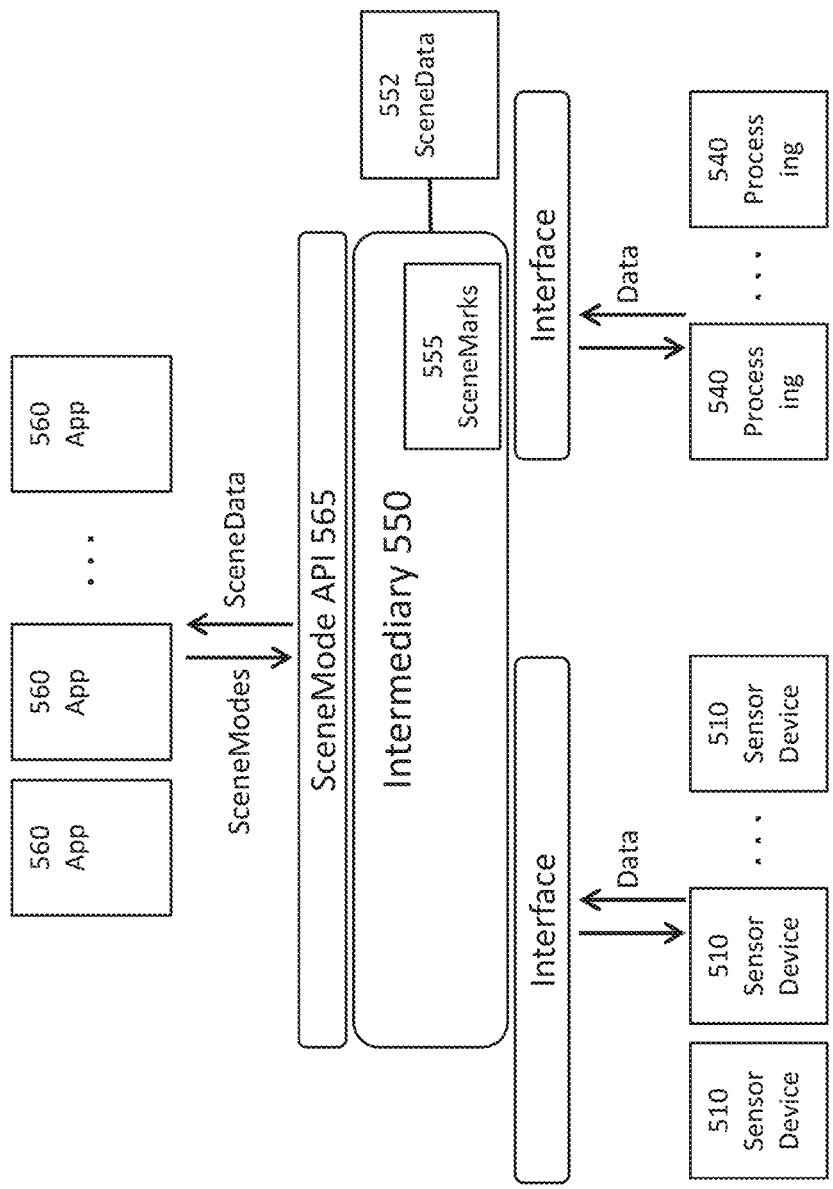
FIG. 5 is a block diagram of a third party providing intermediation services.

FIG. 5 is a block diagram in which a third party 550 provides intermediation services between applications 560 requesting SceneData and sensor networks 510 capable of capturing the sensor data requested. The overall ecosystem may also include additional processing and analysis capability 540, for example made available through cloud-based services. In one implementation, the intermediary 550 is software that communicates with the other components over the Internet. It receives the requests for SceneData from the applications 560 via a SceneMode API 565. The requests are defined using SceneModes, so that the applications 560 can operate at higher levels. The intermediary 550 fulfills the requests using different sensor devices 510 and other processing units 540. The generated SceneData and SceneMarks are returned to the applications 560. The intermediary 550 may store copies of the SceneMarks 555 and the SceneData 552 (or, more likely, references to the SceneData). Over time, the intermediary 550 will collect a large amount of SceneMarks 555, which can then be further filtered, analyzed and modified.

As described above, SceneData can include many different types of data, ranging from the original captured sensor data to data that is the result of complex processing and/or analysis. This processing and analysis may not all occur at the same time and may be requested and/or performed by different entities. For example, one (or more) entities may direct cameras and other sensor devices to capture certain sensor data. That sensor data can be processed, individually or in aggregates, according to requests made by other entities at other times. As a result, different SceneData may be requested, created and distributed by different entities at different times. This sharing of data and access to sensor devices is beneficial, but it also increases the security risk. Not all entities should have access to all data and to all sensor devices.

Figure 6:
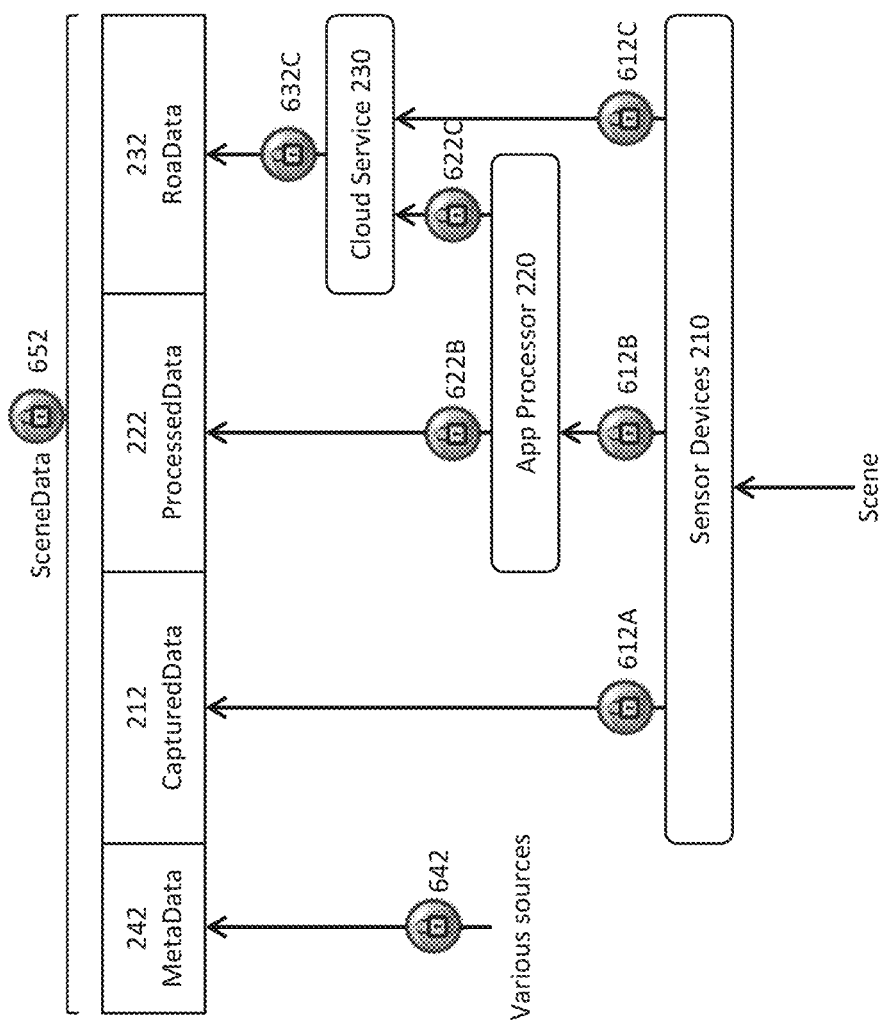
FIG. 6 is a diagram illustrating the securing of SceneData.

FIG. 6 is a diagram illustrating one approach to securing SceneData. FIG. 6 shows the creation of SceneData, as in FIG. 2, but with a security overlay. In this example, different SceneData are secured separately, as indicated by the lock symbols, and possibly using different levels of security. The following example will use encryption as the security measure, but other techniques such as password protection, limited lifetimes (data is available for only a limited time period) and watermarking can also be used. Security can also be implemented by access tokens, with or without times defined. Access tokens may be designed to have limited scope. For example, a token may provide access to one data field but not another. Cryptographic key exchange such as TLS (HTTPS) may be used. Cryptographic signatures may be used to ensure the integrity of the SceneData, as described above.

In FIG. 6, SceneData is created sequentially in a pipelined fashion and security can be applied at each stage of the pipeline. This allows fine grained management of access to data. The sensor devices 210 capture sensor data and encrypt 612A-C the sensor data as it is generated. This can be made available as CapturedData 212 and can also be provided for further processing. The application processor 220 generates ProcessedData 222 from the CapturedData 212, and also encrypts 622B-C this ProcessedData. To do this, it has privileges to decrypt 612B the relevant sensor data. Similarly, cloud services 230 perform heavier analysis to generate RoaData 232, which are then also encrypted 632C. The cloud services 230 have appropriate privileges 612C, 622C to gain access to the data used to generate the RoaData 232.

Different security levels can be used for different SceneData. For example, CapturedData, ProcessedData and RoaData are typically at different levels of sophistication and have different values. Therefore, different levels of encryption 612 vs 622 vs 632 may be used. Different security levels can also be applied to the same SceneData used in different ways. For example, perhaps the same SceneData is available as CapturedData 212, provided to the on-board application processor 220 for real-time clean-up (e.g., noise filtering, some simple image filtering) and also provided in large volumes to cloud services 230 for off-line sophisticated analysis. In that case, the encryption 612B may be lightweight or non-existent because not much data is at risk at any instant in time, the risk of unauthorized use is low since this is an on-board communication between the sensor device 210 and the application processor 220, and processing speed is important. In contrast, the encryption 612C may be more secure because a greater volume of data is provided, and the risk of intercept or unauthorized use is greater. There may also be fewer controls on which cloud services 230 may access the data, or on how secure those cloud services really are. The encryption 612A may depend on the distribution of the CapturedData 212 and which and how many applications have privileges to consume the data. In this example, the security is applied by the entity or device that generates the data, but this is not required.

In some applications, the authenticity of the data is more important than the privacy. For example, in the case that an emergency is occurring (for example fire detected, or firearm detected) it may be beneficial to have this information widely available to enable action to be taken. However the problems becomes whether the detection has been made by an authorized source and whether it is possible for an unauthorized party to delete this information. In such cases, having a signature on the SceneMark announcing the detection of fire is beneficial (to prevent persons or systems creating false alarms) and an authenticated sequence of SceneMarks that enable any system or person subscribing to these announcements to detect a disruption in the publication of a SceneMark indicating such an event has occurred.

This concept of fine-grained security is applicable to all Scene-related data, including MetaData and SceneMarks. In FIG. 6, MetaData is also separately secured 642 and the SceneData as a whole is also secured 652 at that level. The corresponding SceneMarks and fields within SceneMarks may also be separately secured.

Security may also have inheritance properties. For example, if SceneData is generated from component data, the security level for the SceneData may be required to be not less than the security level of each component part. As another example, SceneMarks may indicate the relationship between different Scenes and SceneData and the relationships, in turn, may imply certain security levels on those Scenes and SceneData.

Figure 7A:
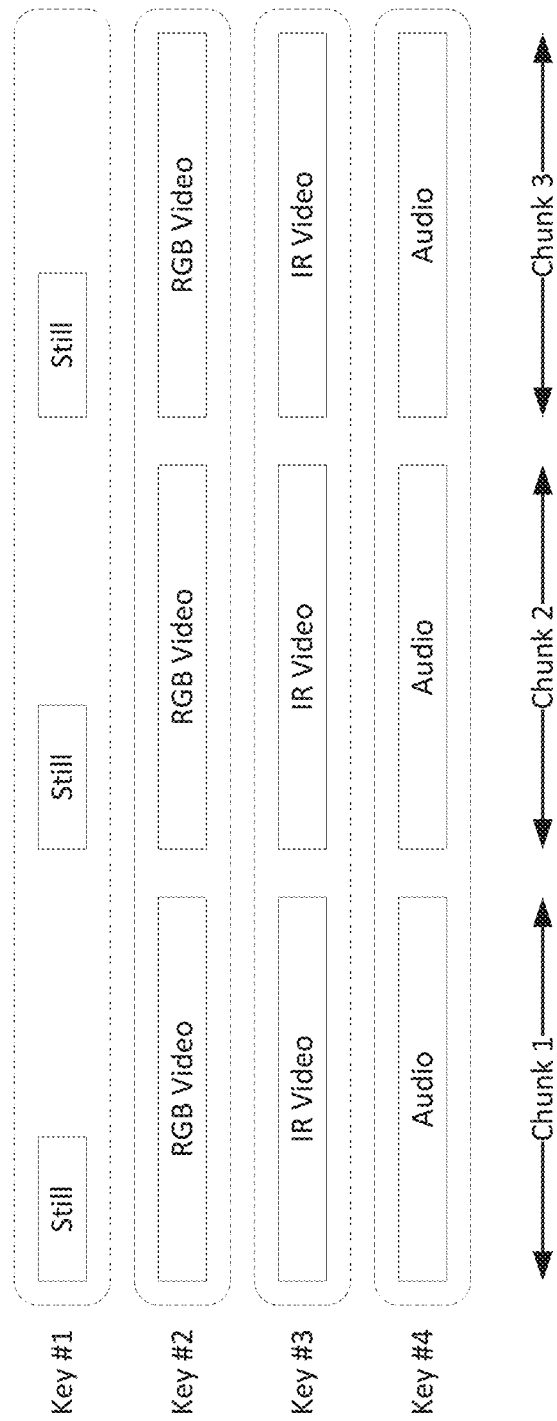
Figure 7B:
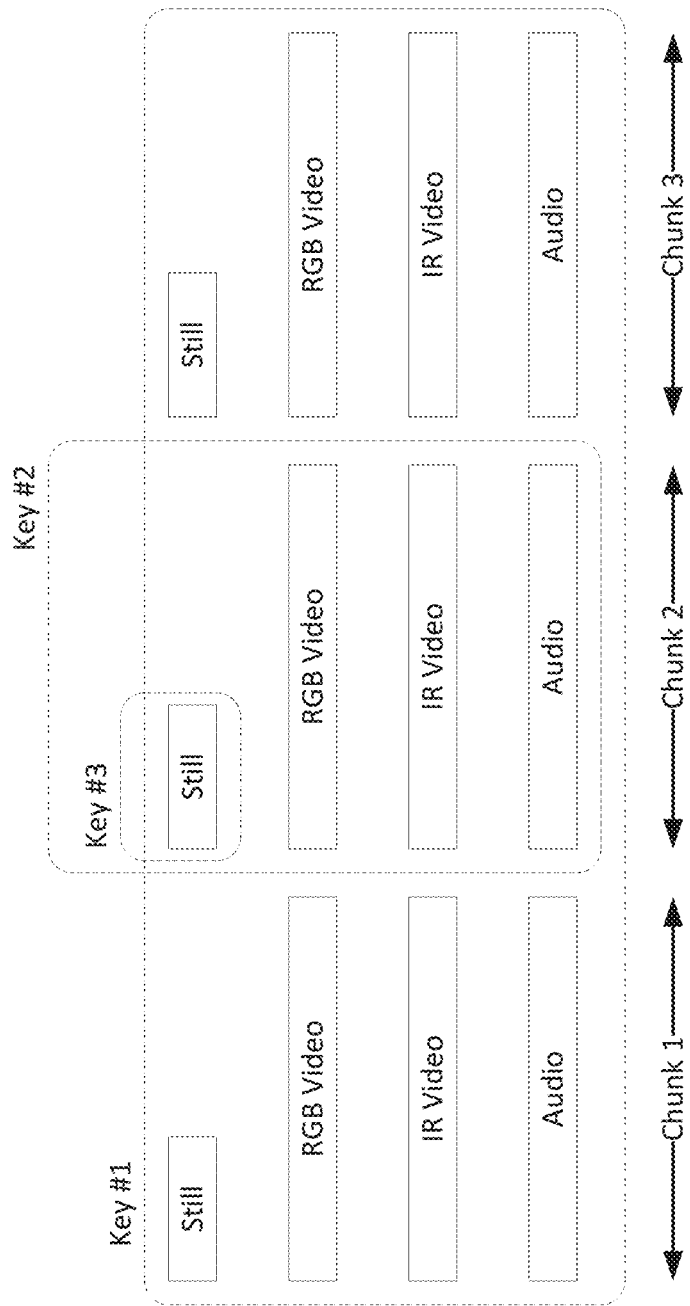

FIGS. 7A-7C illustrate different examples of fine-grained security. In FIG. 7A, sensor devices are capturing a stream of still images, color video, infrared video and audio. This sensor data is divided into chunks, three of which are shown in FIG. 7A. FIG. 7A shows an example where each stream is separately encrypted. Key #1 encrypts the still images, Key #2 encrypts the color video, Key #3 encrypts the IR video and Key #4 encrypts the audio. For example, each sensor device might encrypt the sensor data as it is being produced. An entity which desires access to one stream will need one key. However, an entity which desires access to one chunk will need multiples keys.

A cryptographic signature may be added to a SceneMark. This signature enables whoever is accessing the SceneMark to validate that the SceneMark has not been tampered with. It also enables the system reading the SceneMark to determine all of the SceneData that has been generated and detect whether any SceneData has been removed. This may also be linked with the sequence numbers or time stamps described above. This signature may comply with standards for digital signatures and certificates.

In FIG. 7B, all of the SceneData is encrypted by Key #1. For example, this may be a base level of encryption applied to all sensor data that is captured. However, chunk 2 contains a Scene of interest, so Key #2 is used to apply a stronger level of encryption to the SceneData of chunk 2. In that Scene, because of the identified interest, the still images are high resolution images rather than the lower resolution images that are normally captured. Key #3 encrypts the high resolution still images. The different keys are applied according to the expected demand for different SceneData. Some applications may desire access to the entire stream, for example for routine processing. Access to Scenes of interest (Key #2) and high resolution details (Key #3) may also be desired.

In FIG. 7C, only the still images and visible video are encrypted by Key #1. Perhaps the infrared images and audio are not useful on their own without the visible images. For example, the infrared images might be lower resolution, and the audio may have limited usefulness without the corresponding video. Again, chunk 2 contains a Scene of interest. Key #2 encrypts the raw sensor data. Keys #3 and #4 encrypt higher level data, such as meta data, face recognition, etc.

When data is secured, this supports the definition of privileges as to which entities can perform what activities with which data. Security can be used to limit who can access data, when to access data, who can further distribute the data, to whom the data can be distributed, who can perform analysis of the data, and what types of analysis may be performed, for example. As shown above, security and privileges can be set differently for different data and for different fields within data. They can also be set differently for different entities, applications and services.

An important use case would be the unlocking of SceneData in the event of an emergency. This could be expressed as either a specific event, for example the detection of a firearm by an AI system, or it could simply be the indication by a system or camera that an emergency level has been reached. The rights object defines whether a system may or may not access encrypted SceneData and should also define any logging that should occur. The rights object may have an expression embedded in the form:

```
If (FireArm == TRUE)
   ACCESS = TRUE
ELSE ACCESS = FALSE
```

Another example is:

```
IF (EMERGENCY LEVEL > 4)
   ACCESS = TRUE
ELSE ACCESS = FALSE
```

In this example, EMERGENCY LEVEL is a numerical scale from 1 to 5.

Typically, privileges are set by the owner of the data (or its proxy), which usually is either the entity that controls the sensor devices and/or the entity that is requesting the creation of new data. For example, consider a situation where surveillance cameras are installed to monitor a house. The home owner may set privileges for the sensor data captured by the surveillance cameras. Assume the home owner has hired a third party security company to provide home security. To do this, the home owner grants the security company access to the surveillance video. In addition to providing security for individual homes in a neighborhood, the security company also requests a cloud service to analyze for aggregate behavioral patterns in the neighborhood. Privileges for that data are set by the security company, taking into account the home owner's requirements on the underlying data. This access may also be conditional on the events in the neighborhood. For example, they may be denied until an event has occurred. For example, if a breakin occurs in one house, other houses may provide access.

Figure 8:
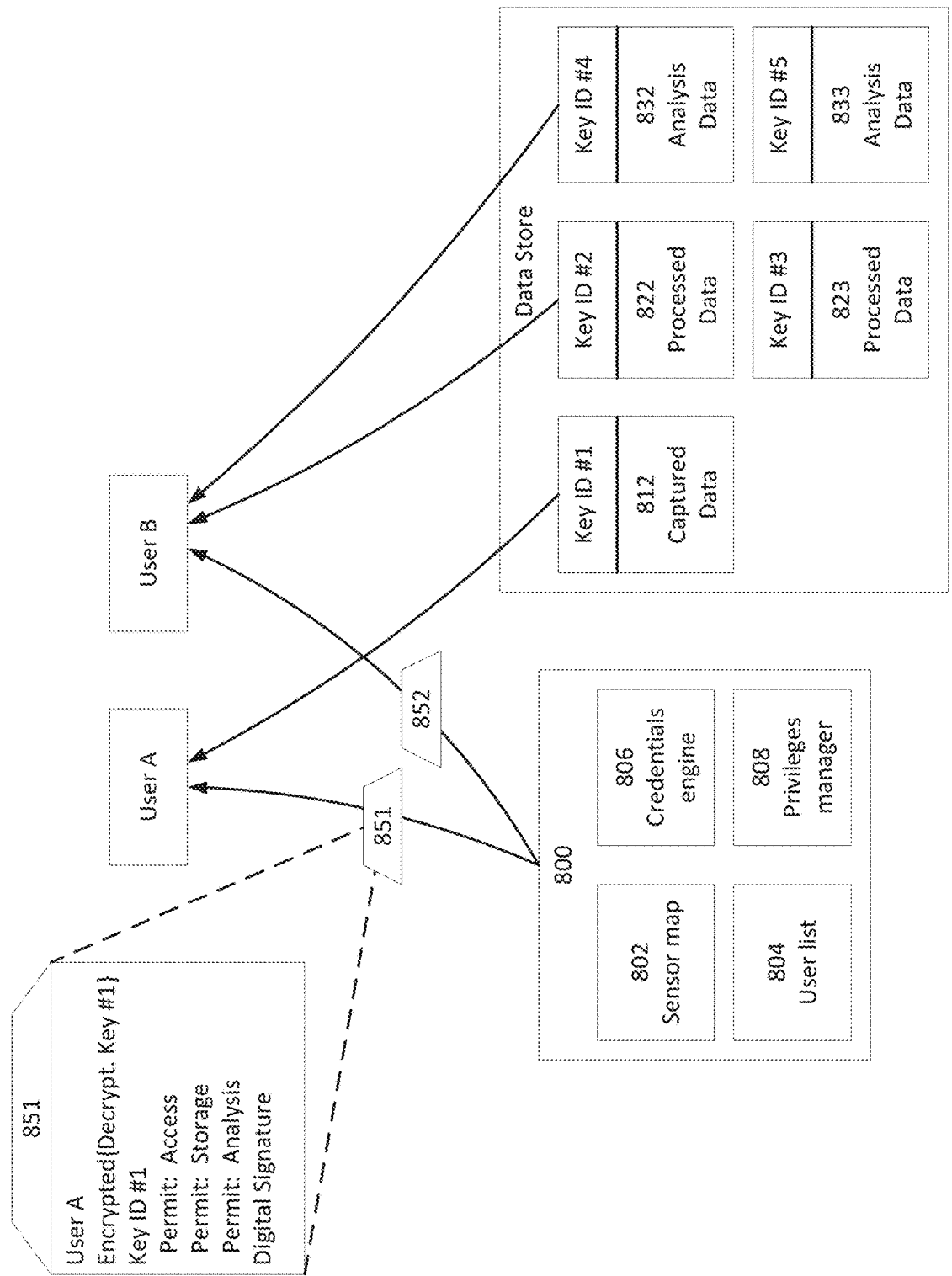
FIG. 8 is a block diagram illustrating management of security and data privileges.

FIG. 8 is a block diagram illustrating management of security and data privileges by a third party, which will be referred to as a privacy management system 800. In one implementation, the intermediary 550 in FIG. 5 also functions as the privacy management system 800. The SceneData in this example includes CapturedData 812, which is encrypted video, two different ProcessedData 822, 823 and two different RoaData 832, 833. Each SceneData is encrypted by a separate key: Key #1 to Key #5. The Key ID's shown in FIG. 8 are used to map these Keys with the corresponding SceneData. That is, the encrypted CapturedData 812 is associated with Key ID #1 so that users know Key #1 was used to encrypt the data. Two users A and B would like to access the SceneData. Note that "users" is defined broadly and could include applications, devices, cloud services and other non-human entities, and also could include entities that are generating SceneData in addition to consuming SceneData. The privacy management system 800 manages access and privileges to the SceneData.

The privacy management system 800 includes a sensor map 802, a user list 804, a credentials engine 806 and a privileges manager 808. The sensor map 802 maintains information about the available sensor devices. The user list 804 maintains information about the users serviced by the privacy management system. The credentials engine 806 authenticates users as they access the system. The privileges manager 808 determines which users have which privileges with respect to which data.

In one approach, the privileges manager 808 implements privileges by issuing rights objects, which define which users have which privileges with respect to which data. In one implementation, the rights objects contains the following:

User ID which identifies the user (e.g., camera, device or cloud service) to which the rights object is issued.
  Decryption Keys to decrypt the data of interest. These keys preferably are encrypted using a key that is unique to the user.
  Key ID(s) that are linked to the Decryption Keys contained in the rights object. The key IDs enable the user to map the decryption keys to the actual encrypted data. For example, in FIG. 8, Key ID #1 informs the user that Decryption Key #1 is used to decrypt CapturedData 812.
  Digital Signature that is used to validate the rights object. Typically, the privacy management system or its proxy provides the digital signature.

The rights object may also contain the following:

Privilege Rules that define the user's privileges. This may include restrictions and/or permissions on access, time window, processing, storage, further distribution, etc.
  Conditional Rules that define under what circumstances a key may be used. For example if Firearm detected=true, then key can be used.
  Encryption Keys that are used to encrypt any output generated by the user. These should also be encrypted by the user's unique key.

In one approach, the user's public key is used to encrypt contents of the rights object, for example the Decryption Keys contained in the rights object. The privacy management system's private key is used to generate the digital signature. The privacy management system's public key is used to verify the signature on the rights object. These keys are managed using a standard public key infrastructure.

Referring to FIG. 8, the privacy management system 800 provides rights object 851 to user A and rights object 852 to user B. The contents of rights object 851 are shown in FIG. 8. It includes encrypted Decryption Key #1 (i.e., the counterpart to Key #1) which can be used to decrypt the CapturedData 812. It also includes privileges rules that indicate user A is allowed to analyze and store the CapturedData. The Key ID #1 allows the user to find the correct data 812. The rights object 851 is encrypted using User A's public key so that only User A can decrypt the rights object. The digital signature is produced using the privacy management system 800's private key, so that User A can verify the contents.

Similarly, rights object 852 for user B includes encrypted Keys #2 and #4, which decrypt ProcessedData 822 and RoaData 832, respectively. The rights object 852 specifies that the decrypted data may not be forwarded by user B to others and may be accessed only within a specific time window. Note that user B may access the ProcessedData 822 and RoaData 832, even though it does not have rights to access the underlying CapturedData 812.

In some cases, fine-grained security can increase the logistical complexity for access to large amounts of data. For example, consider a big data client who purchases access rights for a small component of SceneData, such as geolocation data, time stamp, or motion alert. However, suppose that these small components are to be aggregated from M (could be millions) different sources, each contributing Q instances. If the SceneData is individually encrypted using a fine-grained scheme with separate keys for each component, the big data client will have to individually decrypt M×N×Q small datagrams before it can analyze the data in the aggregate. This can be computationally expensive. In one approach, the system expects demand for this type of aggregate data and creates data sets collected over multiple sources but not individually encrypted. The data may be repurposed for the big data client's specification, subject to restrictions imposed by each source, with the data set as a whole encrypted. This may be done in real time as the data is being collected or by reprocessing previously captured data.

Standard encryption may be used to encrypt video, audio and SceneData. Where the video and audio is encoded using MPEG DASH, the video content (including depth maps, IR and RGB all encoded using MPEG DASH) can be encrypted according to the MPEG DASH encryption standard. This enables interoperability with digital rights management (DRM) systems implemented in devices that are designed to consume high quality movie content (includes TVs, mobile devices, PCs, etc.). The privacy management may enable a DRM server (such as Google's Widevine, Microsoft's Playready or Apple's FairPlay) to enable a specific device to view the video. This does not require modification to the playback device (e.g. TV, mobile device, PC, etc.) to play back the video, even if it is RGB, IR or depth. This entire enablement can occur in the cloud as a privacy management system to DRM server communication. In some instances where DRM systems enable a source device (such as a set top box or camera) to generate a rights object, this enablement of the device to play back video can be implemented in the camera itself. The camera has a DRM agent that conforms to the specific DRM to create the rights object that will enable the subsequent device to playback the SceneData. The privacy management service can enforce viewing rights.

The SceneData encoded in JSON objects may be encrypted using the JOSE framework which includes standard methods for encrypting and signing JSON objects. See http://jose.readthedocs.io/en/latest/ for example.

Figure 9:
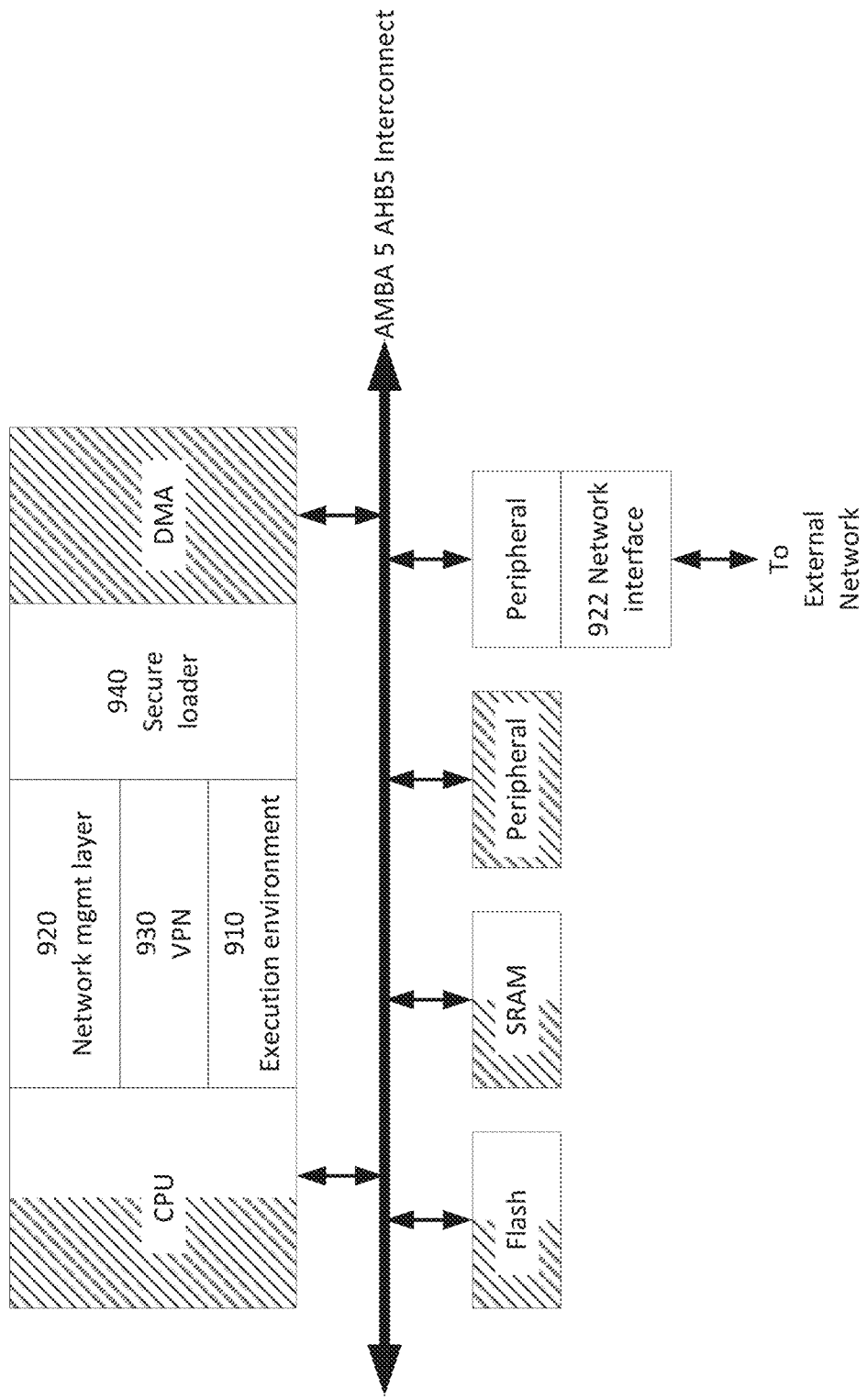
FIG. 9 is a block diagram of a sensor device secured against network threats.

FIGS. 6-8 concern securing data. Another aspect of security is securing the sensor devices themselves. FIG. 9 is a block diagram of a sensor device secured against network threats. In this example, the sensor device includes an execution environment 910 and a network management layer 920. The execution environment 910 operates the sensor device, for example controlling a camera to capture images. The network management layer 920 provides an interface to the external network. It is separate from the execution environment in the sense that code running in the network management layer 920 cannot access or interfere with code running in the execution environment 910. The network management layer 920 also includes a network security stack (not shown in FIG. 9) that provides protection against network threats.

For example, the network security stack may perform functions such as IP address filtering, deep packet inspection and strong verification in order to access the execution environment. In IP address filtering, packets entering or leaving the sensor device are dropped or passed based on their IP address. IP address filtering can be based on a blacklist, where packets received from a blacklisted IP address are dropped. It can also be based on a whitelist, where only packets received from a whitelisted IP address are passed. The network security stack may receive updates of the blacklist and whitelist via the external network. As another example, if the sensor device has been compromised and is being used in a distributed denial-of-service attack, the packet filter can block the DDOS packets from leaving the sensor device.

In deep packet inspection, for certain IP addresses or packet types, the content of the packets are inspected. For example, an HTTP request to submit a login may be intercepted and passed to the proxy for handling. If the sensor device has a weak default password, this method can be used to enforce a robust password. The deep packet inspection intercepts the login request and forces the user to use a robust password.

The system may make use of standard methods to describe viruses or malware carried in the communications to the camera. Examples of methods to describe signatures for malware are defined by standards such as YARA. These rules can be encapsulated in a secure manner (signed and encrypted) and transferred using the certificate and keying methods described herein, i.e., using the public key of the issuing authority to verify the source of the YARA signatures and the public key of the device or a derived key to encrypt the YARA signatures. If an attacker has access to the YARA definitions being transferred to the device, it becomes easier to construct attacks that deviate from the YARA definition.

In FIG. 9, the security architecture is implemented based on a trusted execution environment architecture. The sensor device is partitioned into a trusted region (clear in FIG. 9) and non-trusted region (cross-hatched in FIG. 9). This can be done by a hardware or software hypervisor, such as ARM's TrustZone architecture. The network security stack is implemented in the trusted region and therefore acts as a sort of firewall for the rest of the sensor device. Network traffic is handled in the trusted region before handing off to the non-trusted region. In FIG. 9, the network interface 922 is also in the trusted region.

FIG. 9 also includes a VPN module 930 and a secure loader 940 in the trusted region. The VPN module 930 sets up a virtual private network. This can be used to verify cloud-based services and set up secure communications with cloud-based services. In one implementation, it uses industry standards such as HTTPS. The secure loader 940 manages updates to applications in the trusted region and also manages new applications loaded to the trusted region. It verifies applications and updates come from a trusted source and have not been compromised before loading to the trusted region. For example, updates to the execution environment 910 are handled by the secure loader 940.

Figure 10:
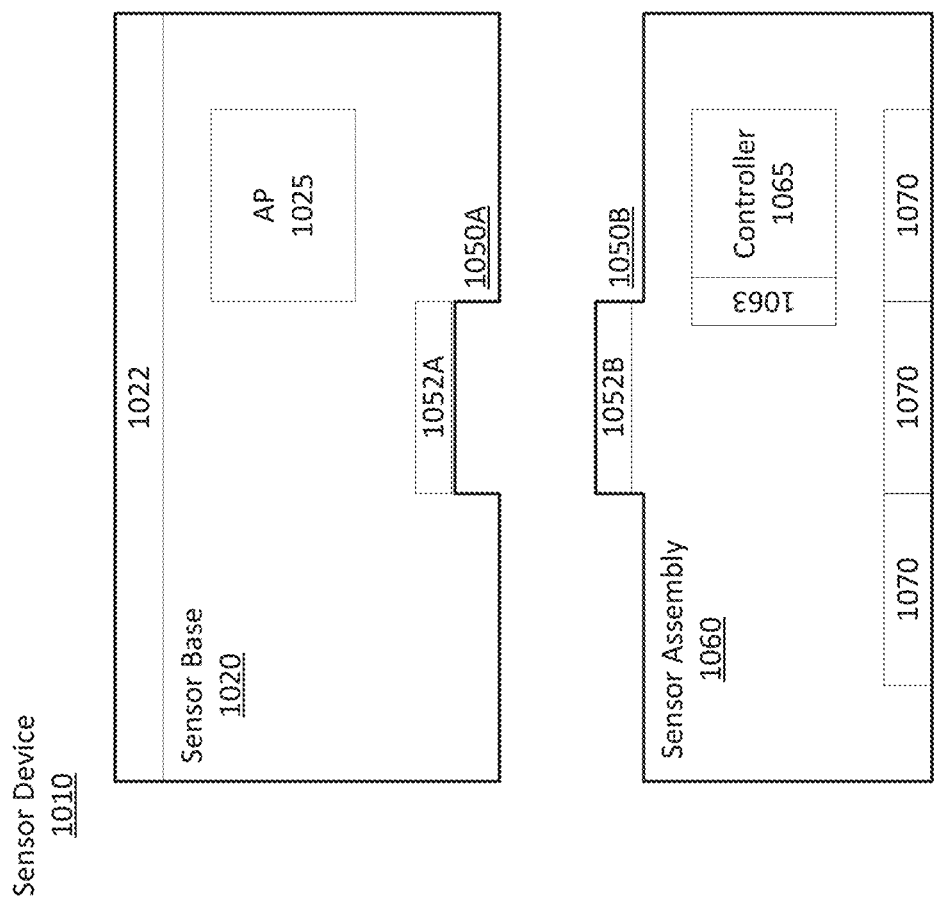
FIG. 10 is a block diagram of a secured sensor device using an interchangeable sensor mount.

In an alternate implementation, the execution environment and network management layer are separated by implementing them on separate hardware. For example, as shown in FIG. 10, the sensor device 1010 may include a sensor base 1020 and an interchangeable sensor assembly 1060 that attaches via mount 1050. The sensor base 1020 includes an interface 1022 to higher layers of the technology stack and an application processor 1025. The mount 1050A includes an interface 1052A to the sensor assembly 1060. The sensor assembly 1060 includes the counterpart mount 1050B and interface 1052B. The assembly 1060 also includes one or more sensor(s) 1070 and a controller 1065. Software-programmable registers 1063 are used to determine the settings for capture of sensor data by the sensors 1070. Further details are provided in U.S. patent application Ser. No. 15/583,919 "Intelligent Interface for Interchangeable Sensors," which is incorporated by reference herein. The network management layer executes on the application processor 1025. The execution environment is implemented primarily by the controller 1065.

Figure 11A:
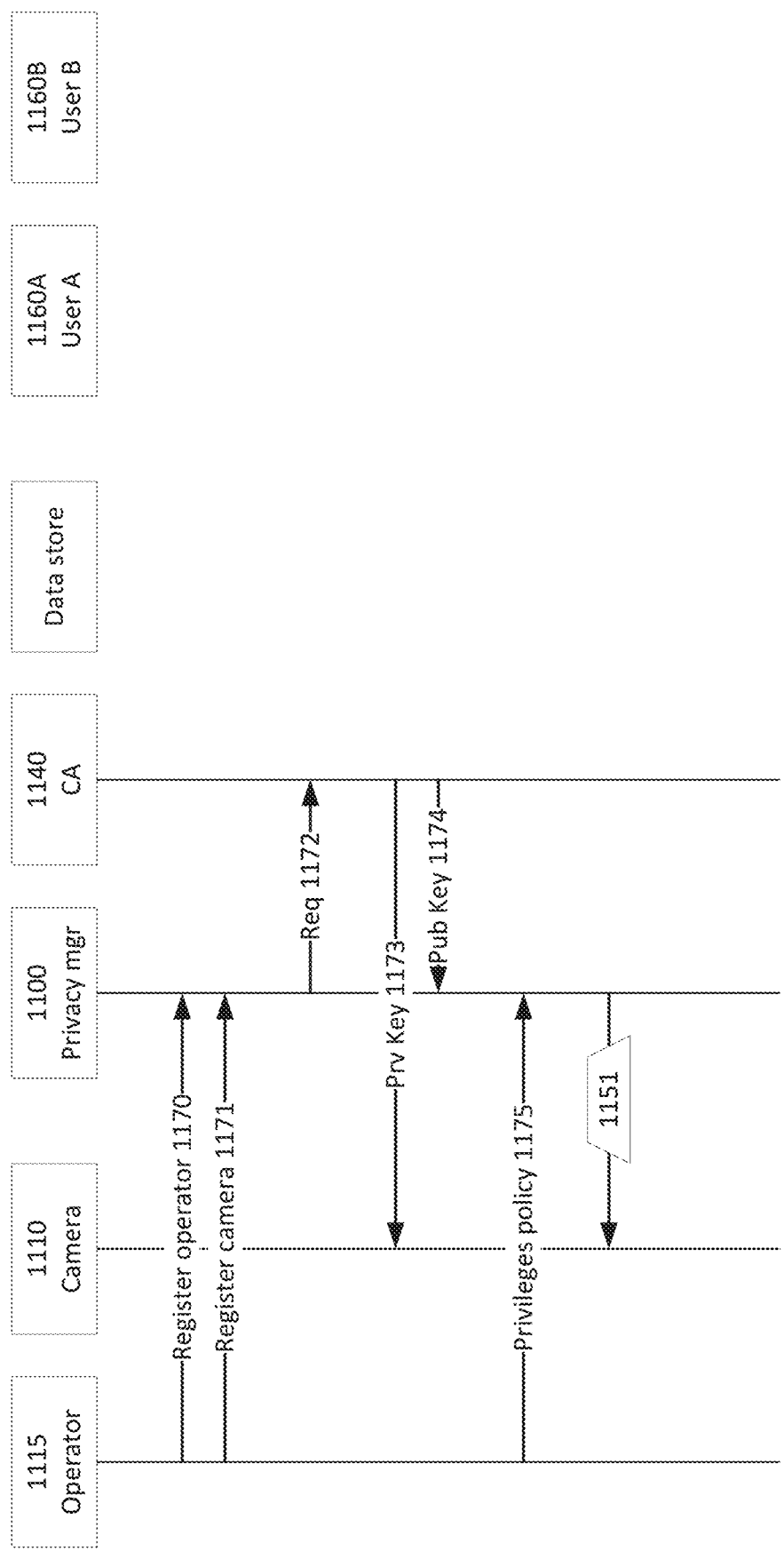
FIGS. 11A-11C illustrate use of a privacy management system.
Figure 11B:
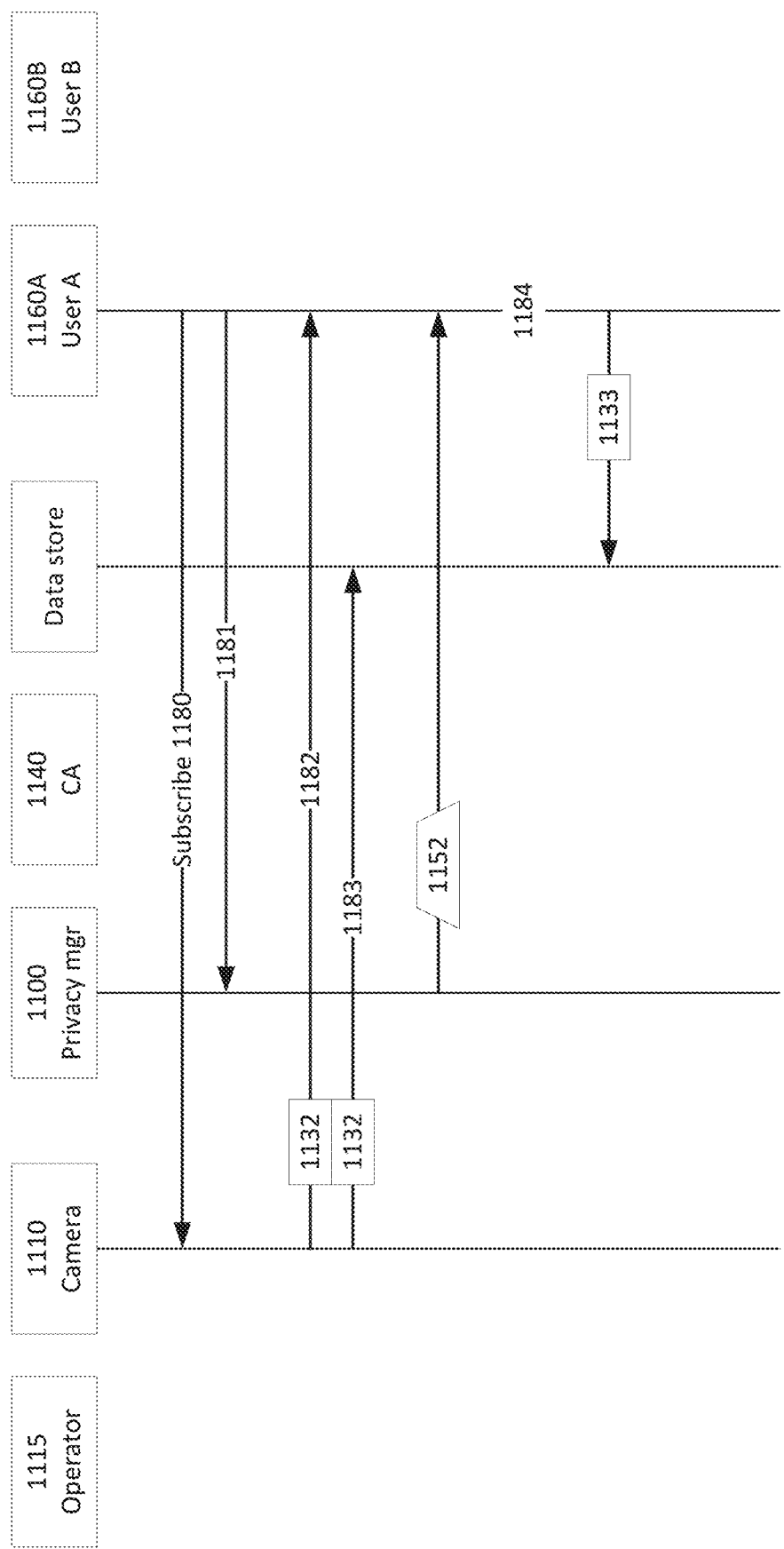
Figure 11C:
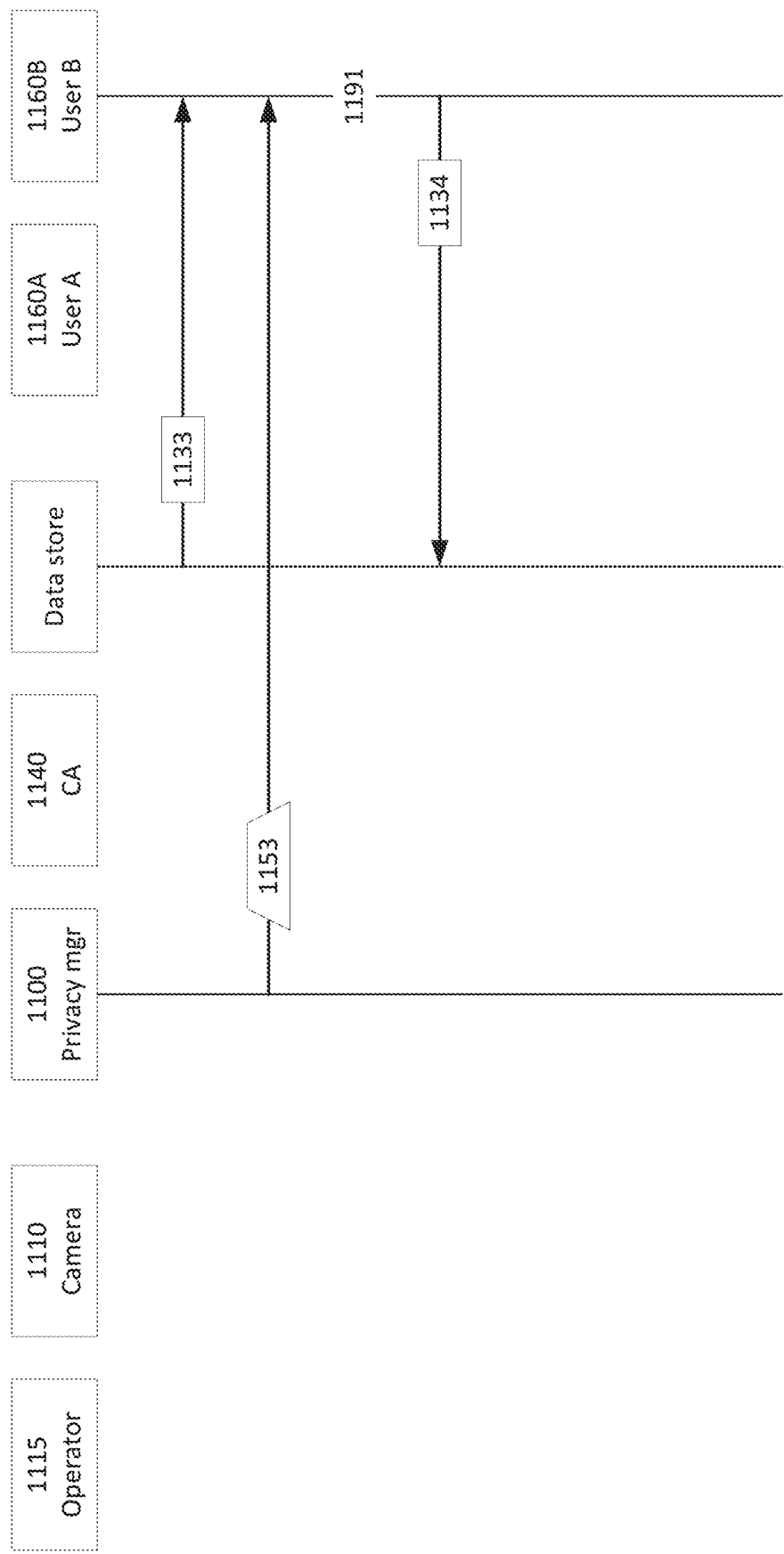

FIGS. 11A-C illustrate use of a security system as described above. These figures show a privacy management system 1100 as described in FIG. 8, certificate authority (CA) 1140 and data store. It also shows a sensor device (camera in this example) 1110 and its operator 1115, and users/applications 1160A-B. The CA provides digital certificates and manages the public key infrastructure. FIG. 11A illustrates a registration process for the operator and camera. The operator creates 1170 an account with the privacy management system and registers 1171 the camera with the operator's account. With reference to FIG. 8, creating 1170 the account adds the operator to the user list 804. Registering 1171 the camera adds the camera to the sensor map 802. The privacy manager requests 1172 certificate services from the CA. The CA issues 1173 a private key and key ID to the camera. The privacy management system downloads 1174 the public key for the camera and associates the camera's public key with the operator's account. The operator sets 1175 his privileges policy for the camera, which is implemented in the privileges manager 808. If necessary, the privacy management system transmits a rights object 1151 to the camera, for example instructing the camera to always encrypt captured images.

FIG. 11B illustrates creation of SceneData. User A (1160A) wants to subscribe to the images captured by camera 1110. The user requests 1180 SceneData 1132 by specifying SceneModes in a Scene-based API. The privacy manager is also informed in order to assure that user A has the requisite privileges. The camera returns 1182 the requested SceneData 1132, encrypted by the camera's private key and transmits 1183 a copy to a data store. The privacy manager authenticates the user A (by credentials engine 806) and then provides the corresponding rights object 1152 to the user. If user A has sufficient privileges, the rights object includes the camera's public key so that user A is able to decrypt and process 1184 the SceneData as desired. Assume that user A analyzes the SceneData 1132 and produces additional SceneData 1133, which is also stored in the data repository.

The privacy management system may also instruct the camera to switch on authentication. This may be done without encrypting the data by applying a hash to the data and including the hash into a cryptographic signature. Alternatively, the previously mentioned usage of time stamps or counters may be used. In this case, the time stamps or counters should be part of the encrypted SceneData.

In FIG. 11C, at a later time, user B (1160B) wants to access this additional SceneData 1133, which is encrypted by user A's private key. User B retrieves the encrypted SceneData 1133 and also obtain the corresponding rights object 1153 from the privacy manager, after authentication. If user B has sufficient privileges, the rights object includes user A's public key so that user B is able to decrypt and process 1191 the SceneData 1133 as desired. The newly generated SceneData 1134 may be stored for later use and analysis.

This is just an example. Although the detailed description contains many specifics, these should not be construed as limiting the scope of the invention but merely as illustrating different examples and aspects of the invention. It should be appreciated that the scope of the invention includes other embodiments not discussed in detail above. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

Alternate embodiments are implemented in computer hardware, firmware, software, and/or combinations thereof. Implementations can be implemented in a computer program product tangibly embodied in a machine-readable storage device for execution by a programmable processor; and method steps can be performed by a programmable processor executing a program of instructions to perform functions by operating on input data and generating output. Embodiments can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

What is claimed is:

1. A method for enabling application-configured monitorings of spaces, the method comprising:
    receiving SceneData produced by different non-human technological entities; wherein the entities comprise a group of one or more sensor devices including multiple cameras that capture images of spaces, and some of the entities perform analysis of the captured images using artificial intelligence and/or machine learning;
    receiving requests from applications for different monitorings of spaces and configuring the entities into different workflows that implement the different space monitorings requested by the applications; wherein the workflows provide to the applications some of the SceneData produced by the entities in the workflows; and a first workflow for one of the applications includes cameras capturing images relating to the space monitoring, and using artificial intelligence and/or machine learning to (a) detect a predefined event in the captured images relating to the space monitoring or (b) detect a predefined object in the captured images relating to the space monitoring;

receiving a specification of privileges governing access to the SceneData; wherein at least some of the SceneData produced by the entities is secured against unauthorized access according to the specification of privileges, and access to the secured SceneData is unlocked upon (a) detection of the predefined event in the captured images relating to the space monitoring, or (b) detection of the predefined object in the captured images relating to the space monitoring; and controlling access to the SceneData based on the specification of privileges; wherein the SceneData provided to the corresponding application by the first workflow includes the secured SceneData that is unlocked by the detection by the first workflow of the predefined event or predefined object.

2. The method of claim 1 wherein the specification of privileges governing access to the SceneData produced by an individual one of the entities is determined by the individual entity or by an organization controlling the individual entity.

3. The method of claim 1 wherein the specification of privileges governing access to the SceneData comprises rules specifying conditional access upon detection of the predefined event or predefined object.

4. The method of claim 1 further comprising:
generating SceneMarks upon detection of the predefined event or predefined object; wherein the SceneMarks contain indications of detection of the predefined event or predefined object, and access to the secured SceneData is unlocked by SceneMarks containing such indications.

5. The method of claim 1 wherein the specification of privileges governing access to the SceneData is based on privacy regulations governing the SceneData.

6. A system for enabling application-configured monitorings of spaces, the system comprising:
a plurality of non-human technological entities that produce data, including capturing images of spaces and performing analysis of the captured images using artificial intelligence and/or machine learning; wherein at least some of the data produced by the entities is secured against unauthorized access, and access to the secured data is unlocked upon (a) detection of a predefined event in the captured images relating to monitoring of the space, or (b) detection of a predefined object in the captured images relating to monitoring of the space; and
an application programming interface (API), via which applications can configure the entities into different workflows that implement different monitorings of spaces; wherein the applications receive some of the data produced by the workflows (SceneData), a first workflow for one application includes cameras capturing images relating to the space monitoring and detecting the predefined event or predefined object using artificial intelligence and/or machine learning, and the SceneData received by that application includes the secured data that is unlocked by the detection by the first workflow of the predefined event or predefined object.

7. The system of claim 6 wherein data produced by different entities are secured separately.

8. The system of claim 6 wherein the data is secured using multiple different levels of security.

9. The system of claim 6 wherein the applications include rules that specify which applications are authorized to access which data.

10. The system of claim 6 wherein the security for the data is defined by rules specifying conditional access upon detection of the predefined event or predefined object.

11. The system of claim 6 wherein some of the data produced by the workflow includes metadata describing content of the secured data, the metadata is not secured, but the description in the metadata is sufficient to determine whether or not the predefined event or predefined object has been detected.

12. The system of claim 6 further comprising:
log files that log accesses to the secured data.

13. The system of claim 6 further comprising:
a cryptographic key exchange used to implement the security for the data.

14. A method for enabling application-configured monitorings of spaces, the method comprising:
receiving, via an application programming interface (API), requests from applications for different monitorings of spaces; and
configuring a plurality of non-human technological entities to implement workflows for the requested monitorings of spaces, the entities including cameras that view the monitored spaces, wherein the workflows include:
the cameras capturing images of the monitored spaces;
securing at least some of the captured images against unauthorized access, wherein access to the secured images is unlocked upon (a) detection of a predefined event in the captured images relating to monitoring of the space, or (b) detection of a predefined object in the captured images relating to monitoring of the space;
artificial intelligence and/or machine learning (AI/ML) entities performing analysis of the captured images; and
for a first of the workflows: one of the AI/ML entities detects the predefined event or predefined object as part of the workflow, and the unlocked images are used later in the workflow.

15. The method of claim 14 wherein the first workflow further comprises:
capturing additional images or performing additional analysis of captured images responsive to detection of the predefined event or predefined object.

16. The method of claim 14 wherein some of the data produced by the workflow includes metadata describing content of the secured data, the metadata is not secured, but the description in the metadata is sufficient to determine whether or not the predefined event or predefined object has been detected.

17. The method of claim 14 wherein some of the data produced by the workflow includes metadata indicating detection of the predefined event or predefined object, and said detection is messaged to other entities by transmitting the metadata to the other entities.

18. The method of claim 14 wherein access to the secured data is unlocked upon reaching an alert level as determined by the artificial intelligence or machine learning from the captured images.

19. The method of claim 14 wherein access to the secured data is unlocked upon detection of an emergency in the captured images, detection of a dangerous situation in the captured images, detection of a suspicious activity in the captured images, or detection of anomalous behavior in the captured images.

20. The method of claim 14 wherein access to the secured data is unlocked upon detection of an unauthorized individual in the captured video, detection of a firearm in the captured images, or detection of a dangerous object in the captured images.

* * * * *